(12) United States Patent
Tveit

(10) Patent No.: US 8,489,614 B2
(45) Date of Patent: Jul. 16, 2013

(54) RANKING ACADEMIC EVENT RELATED SEARCH RESULTS USING EVENT MEMBER METRICS

(75) Inventor: Amund Tveit, Trondheim (NO)

(73) Assignee: Google Inc., Mountain View, CA (US)

( * ) Notice: Subject to any disclaimer, the term of this patent is extended or adjusted under 35 U.S.C. 154(b) by 1273 days.

(21) Appl. No.: 11/302,253

(22) Filed: Dec. 14, 2005

(65) Prior Publication Data
US 2007/0136272 A1 Jun. 14, 2007

(51) Int. Cl.
*G06F 7/00* (2006.01)
*G06F 17/30* (2006.01)

(52) U.S. Cl.
USPC .......................................... 707/748; 707/749

(58) Field of Classification Search
USPC ................................. 707/748, 749
See application file for complete search history.

(56) References Cited

U.S. PATENT DOCUMENTS

| | | | |
|---|---|---|---|
| 5,572,728 A * | 11/1996 | Tada et al. ................................ 1/1 | |
| 5,594,897 A * | 1/1997 | Goffman ........................ 707/102 | |
| 6,119,114 A | 9/2000 | Smadja | |
| 6,285,999 B1 * | 9/2001 | Page ................................. 707/5 | |
| 6,549,896 B1 | 4/2003 | Candan et al. | |
| 6,725,259 B1 | 4/2004 | Bharat | |
| 6,728,725 B2 | 4/2004 | Garfield et al. | |
| 6,738,780 B2 | 5/2004 | Lawrence et al. | |
| 6,871,202 B2 | 3/2005 | Broder | |
| 6,886,010 B2 | 4/2005 | Kostoff | |
| 6,886,129 B1 | 4/2005 | Raghavan et al. | |
| 7,069,592 B2 * | 6/2006 | Porcari ............................ 726/26 | |
| 7,243,109 B2 * | 7/2007 | Omega et al. .................. 707/102 | |
| 2002/0120619 A1 * | 8/2002 | Marso et al. ....................... 707/3 | |

OTHER PUBLICATIONS

International Search Report for International Application No. PCT/US2006/062074 mailed Mar. 9, 2007 (3 pages).
B. Aleman-Meza, et al., "Context-Aware Semantic Association Ranking" *Large Scale Distributed Information Systems*; XP002420424—University of George, Athens, GA, USA; lsdis.cs.uga.edu/lib/download/AHAS03-SWD-Workshop.pdf>; pp. 1-18; Sep. 7-8, 2003.
L. Page, et al.; "The PageRank Citation Ranking: Bringing Order to the Web"; *Stanford Digital Libraries Working Paper*; XP002951571; pp. 1-17; Jan. 1998.
J. Freyne, et al., "Further Experiments on Collaborative Ranking in Community-Based Web Search"; *Artificial Intelligence Review*; The Netherlands; XP002420425; www.springerlink.com/content/u4350v1312137457/fulltext.pdf>; pp. 229-252, Jun. 2004.
J.E. Leide, et al., "Visualization Schemes for Domain Novices Exploring a Topic Space: the Navigation Classification Scheme"; *Information Processing & Management*,; vol. 39, No. 6; XP004441269; pp. 923-940; Nov. 2003.

(Continued)

*Primary Examiner* — Mariela Reyes
(74) *Attorney, Agent, or Firm* — Harrity & Harrity, LLP

(57) ABSTRACT

A system receives a search query related to an academic event of multiple academic events, the academic event having a committee with one or more members. The system searches a corpus of documents associated with the multiple academic events based on the search query to produce a set of search result documents. The system ranks the set of search result documents based on metrics associated with the one or more committee members of the academic event.

34 Claims, 22 Drawing Sheets

OTHER PUBLICATIONS

International Preliminary Report on Patentability dated Jun. 26, 2008 issued in corresponding PCT application No. PCT/US2006/062074, 8 pages.

Sidiropoulos et al., "A new perspective to automatically rank scientific conferences using digital libraries", Elsevier Information Processing and Management, pp. 289-312, 2003.

Garfield, "Citation Analysis as a Tool in Journal Evaluation", Essays of an Information Scientist, vol. 1, 1972, 24 pages.

Garfield, "How can impact factors be improved?", 1996, 3 pages.

Sidiropoulos et al., "A new perspective to automatically rank scientific conferences using digital libraries", Information Processing and Management 41, 2003, pp. 289-312.

Callaham et al., "Journal Prestige, Publication Bias, and Other Characteristics Associated with Citation of Published Studies in Peer-Reviewed Journals", vol. 287, No. 21, Jun. 5, 2002, 4 pages.

West, "Impact factors need to be improved", BMJ vol. 313, Nov. 30, 1996, 1 page.

* cited by examiner

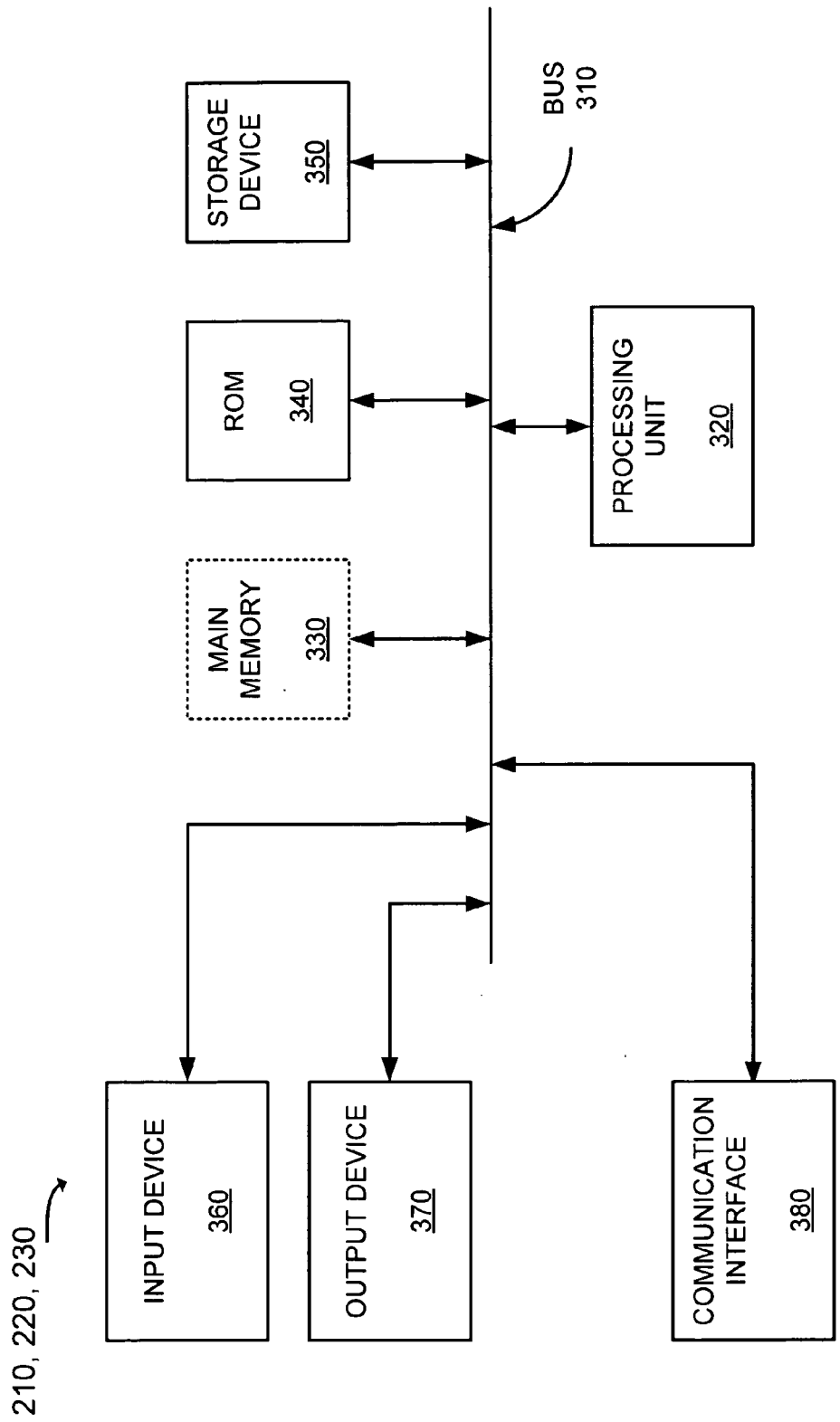

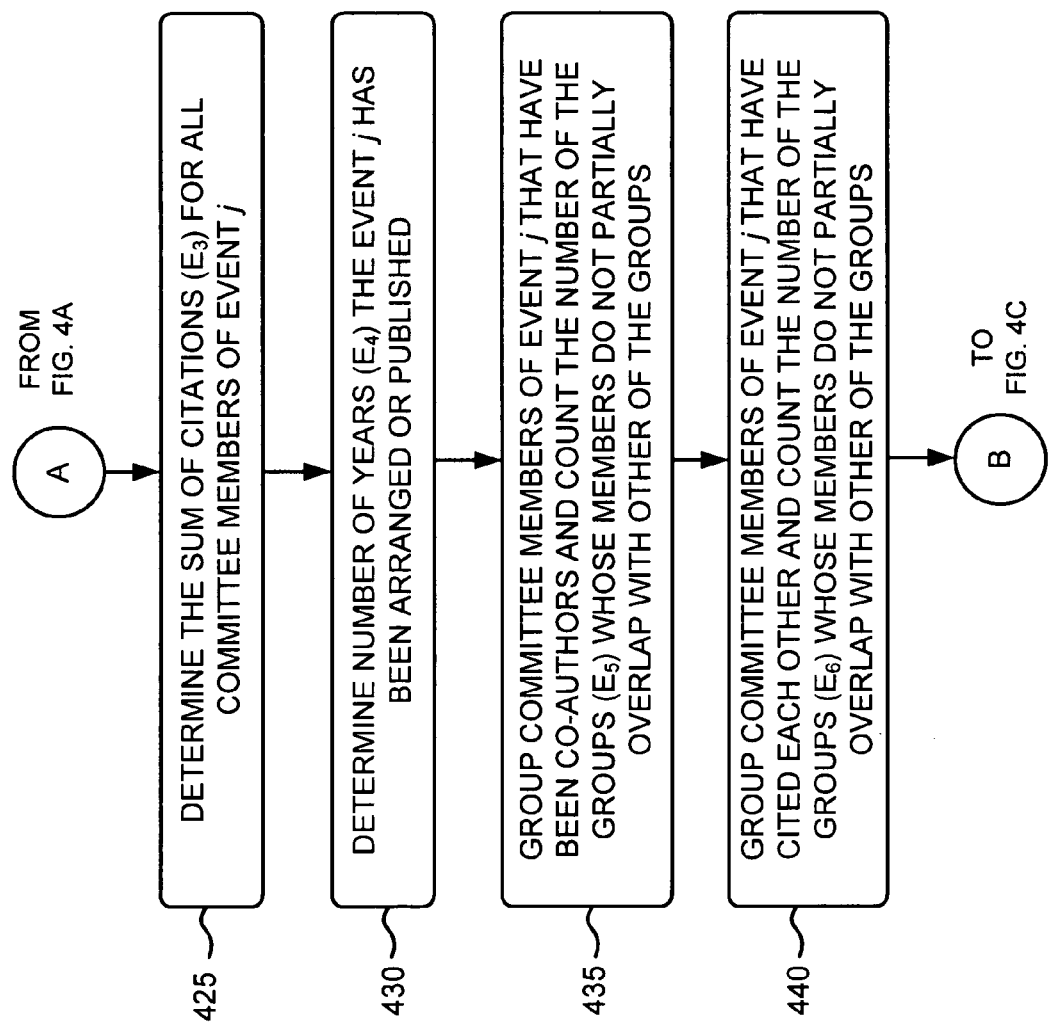

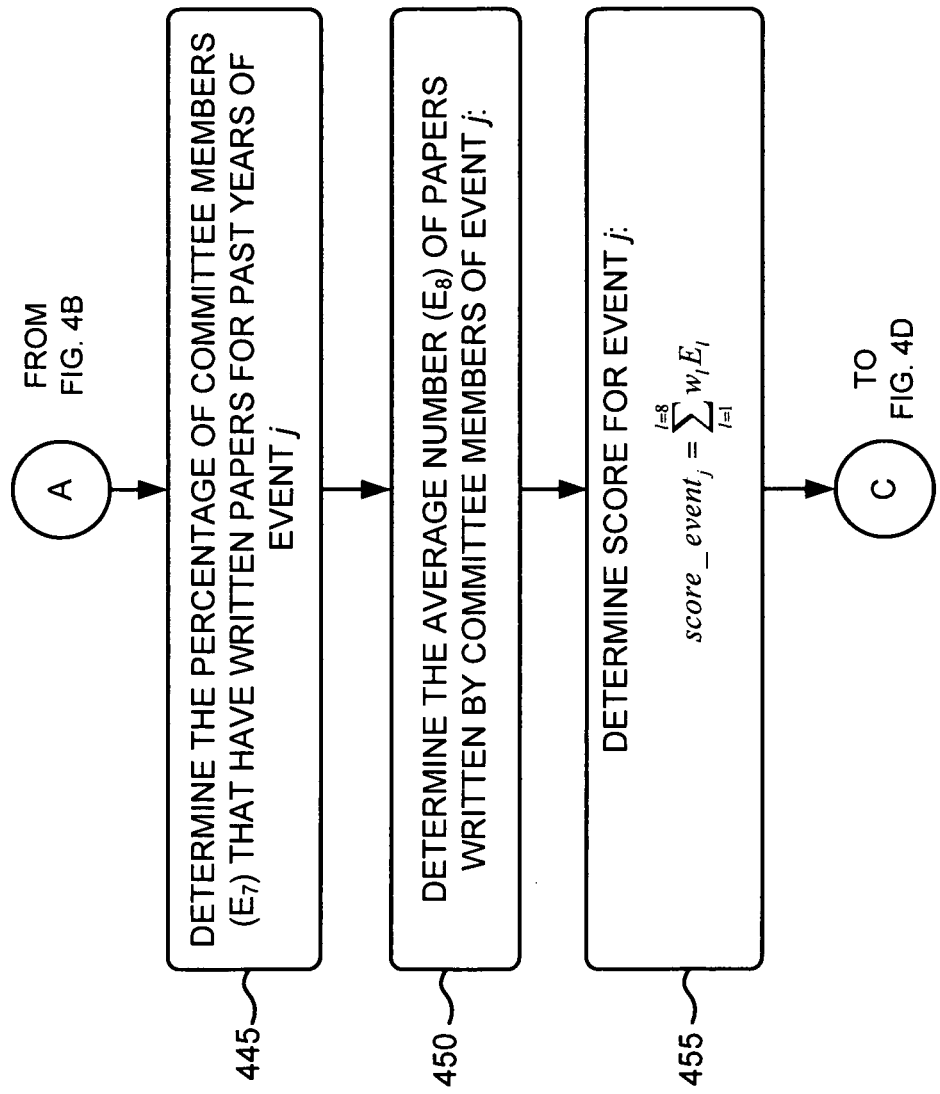

RANKING ACADEMIC EVENT RELATED SEARCH RESULTS USING EVENT MEMBER METRICS

BACKGROUND

1. Field of the Invention

Implementations described herein relate generally to data searching and, more particularly, to searching data related to academic events.

2. Description of Related Art

Existing data aggregation services (e.g., Google) search out, and aggregate, content published on web pages throughout the Internet. In response to a search query from a user, the data aggregation service, using a search engine, searches the aggregated content and presents to the user web pages from the aggregated content relevant to the query. The web pages may be ranked using various existing ranking techniques.

When searching content related to academic events (e.g., academic conferences, workshops, journals), existing ranking techniques, for example, rank the academic events based on measures of cross-event paper citations. For example, if a paper at conference A and a paper at conference B both cite papers at conference C, the ranking of conference C will increase relative to other conferences being searched. This existing approach for ranking academic events does not take into account the importance of program or editorial committees at conferences/journals/workshops. This existing approach further cannot be used when there is not historical data of citations available for a conference. Many conferences may not have cited papers, and this existing ranking technique does not work when a conference does not have cited papers (i.e., all non-cited conferences will get the same ranking).

SUMMARY

According to one aspect, a computer-implemented method may include determining members of a committee of an event and obtaining metrics associated with the committee members. The method may further include ranking documents associated with the event among other documents based on the obtained metrics.

According to another aspect, a computer-implemented method may include obtaining parameters associated with committee members of multiple academic events. The method may further include determining scores for ranking results of a search for one or more of the multiple academic events based on the obtained parameters.

According to a further aspect, a computer-implemented method may include determining multiple metrics associated with committee members of an academic event and assigning a score to the academic event based on the multiple metrics. The method may further include using the assigned score to rank a document associated with the academic event among other documents.

According to an additional aspect, a computer-implemented method may include receiving a search query related to an academic event of multiple academic events, the academic event having a committee with one or more members. The method may further include searching a corpus of documents associated with the multiple academic events based on the search query to produce a set of search result documents and ranking the set of search result documents based on metrics associated with the one or more committee members of the academic event.

According to a further aspect, a computer-implemented method may include obtaining metrics directly associated with multiple events. The method may further include ranking the multiple events among one another based on the obtained metrics.

According to yet another aspect, a computer-implemented method may include determining members of a committee of an event and obtaining metrics associated with the committee members. The method may further include ranking the event among other events based on the obtained metrics.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 3 is an exemplary diagram of a client or server of FIG. 2 according to an implementation consistent with principles of the invention;

FIGS. 4A, 4B, 4C and 4D is a flowchart of an exemplary process for scoring academic events based on event committee member metrics consistent with principles of the invention;

DETAILED DESCRIPTION

The following detailed description of the invention refers to the accompanying drawings. The same reference numbers in different drawings may identify the same or similar elements. Also, the following detailed description does not limit the invention.

Consistent with aspects of the invention, metrics associated with program or editorial committees associated with academic events may be used for ranking documents and/or content associated with those academic events. The academic events may include, for example, conferences, workshops or journals. Program or editorial committees of academic events may typically be organized by senior researchers (e.g., researchers with PHDs). Committee members of academic events, thus, will typically have a number of citations to their credit. Citations of committee members of academic events, among other metrics, may be used for ranking search results of documents related to academic events.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). "Documents" as used herein may additionally include articles or papers published in journals, or with respect to conferences or workshops. A "link," as the term is used herein, is to be broadly interpreted to include any reference to/from a document from/to another document or another part of the same document.

Overview

Figure 1:
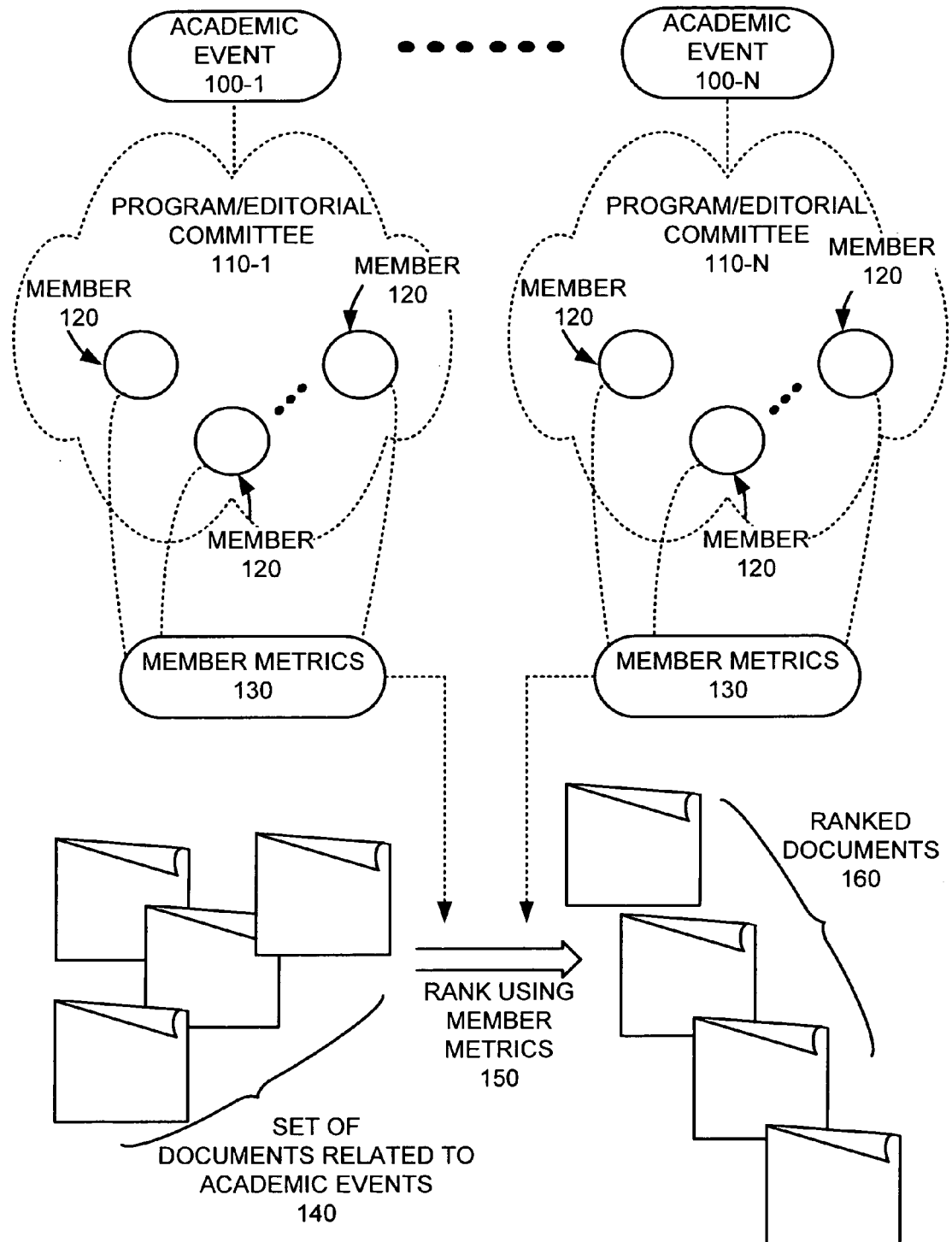
FIG. 1 is an exemplary diagram of an overview of an implementation of the invention.

FIG. 1 illustrates an exemplary overview of an implementation of the invention that scores academic events based on metrics associated with program or editorial committee members of the academic events. The academic events may include, for example, conferences, workshops or journals. As illustrated, academic events 100-1 through 100-N (collectively referred to as "academic event 100") may each include a respective program/editorial committee 110-1 through 110-N (collectively referred to herein as "program/editorial committee 110"). Each program/editorial committee 110 may include one or more members 120. Various member metrics 130, as will be further described below, may be associated with each member 120 of a committee 110.

During a search of content or documents related to academic events, a set of documents 140 may be obtained. The set of documents 140 may be ranked 150 based on the committee member metrics 130 to produce a set of ranked documents 160 that are ordered based on the member metrics 130. Prior to ranking, member metrics 130 may be used to score each academic event 100-1 through 100-N, and the scores for each academic event 100-1 through 100-N may further be used in the ranking process. Other metrics (not shown), directly associated with the academic events, but not with committee members of the events may be used additionally, or alternatively, to member metrics 130, as further described below.

EXEMPLARY NETWORK CONFIGURATION

Figure 2:
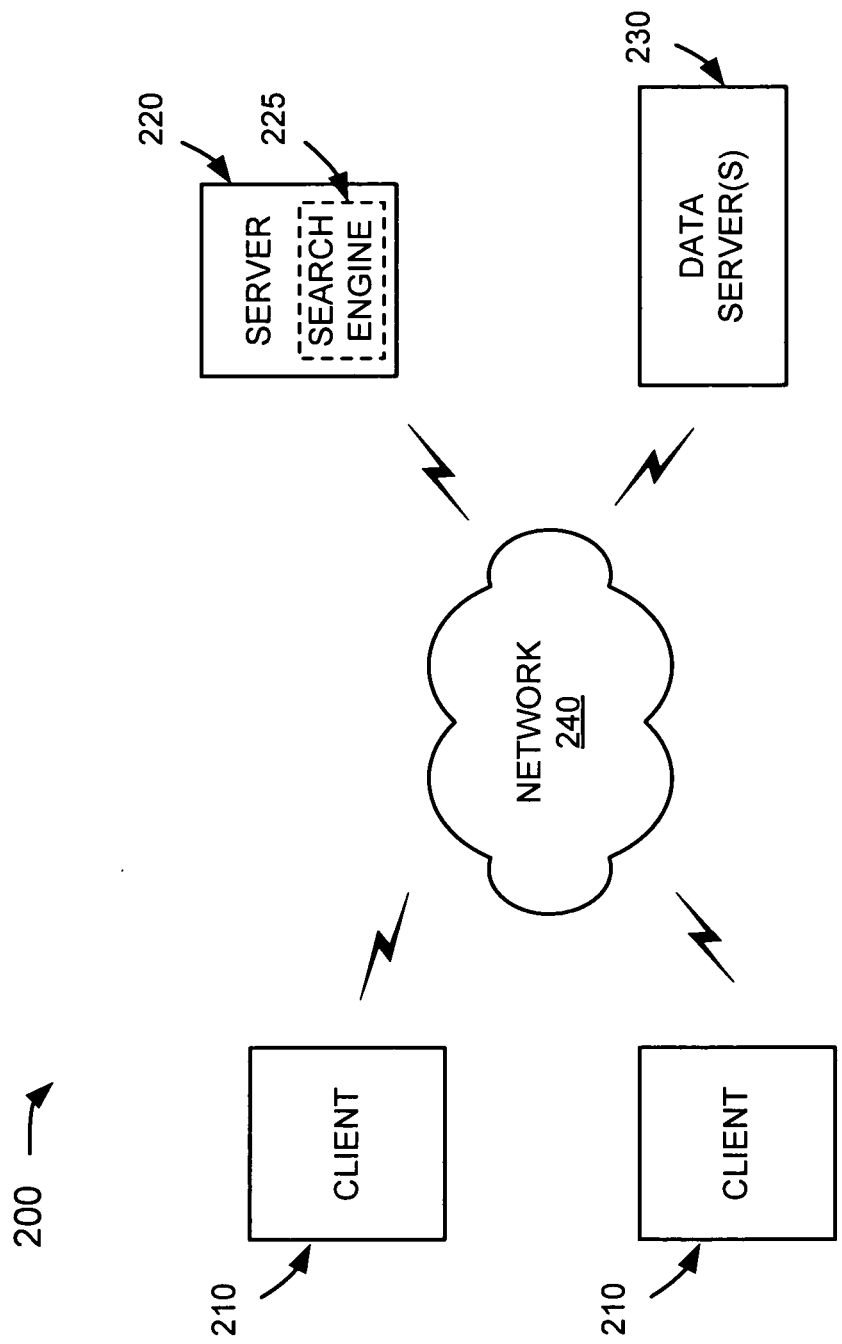
FIG. 2 is an exemplary diagram of a network in which systems and methods consistent with principles of the invention may be implemented.
Figure 4A:
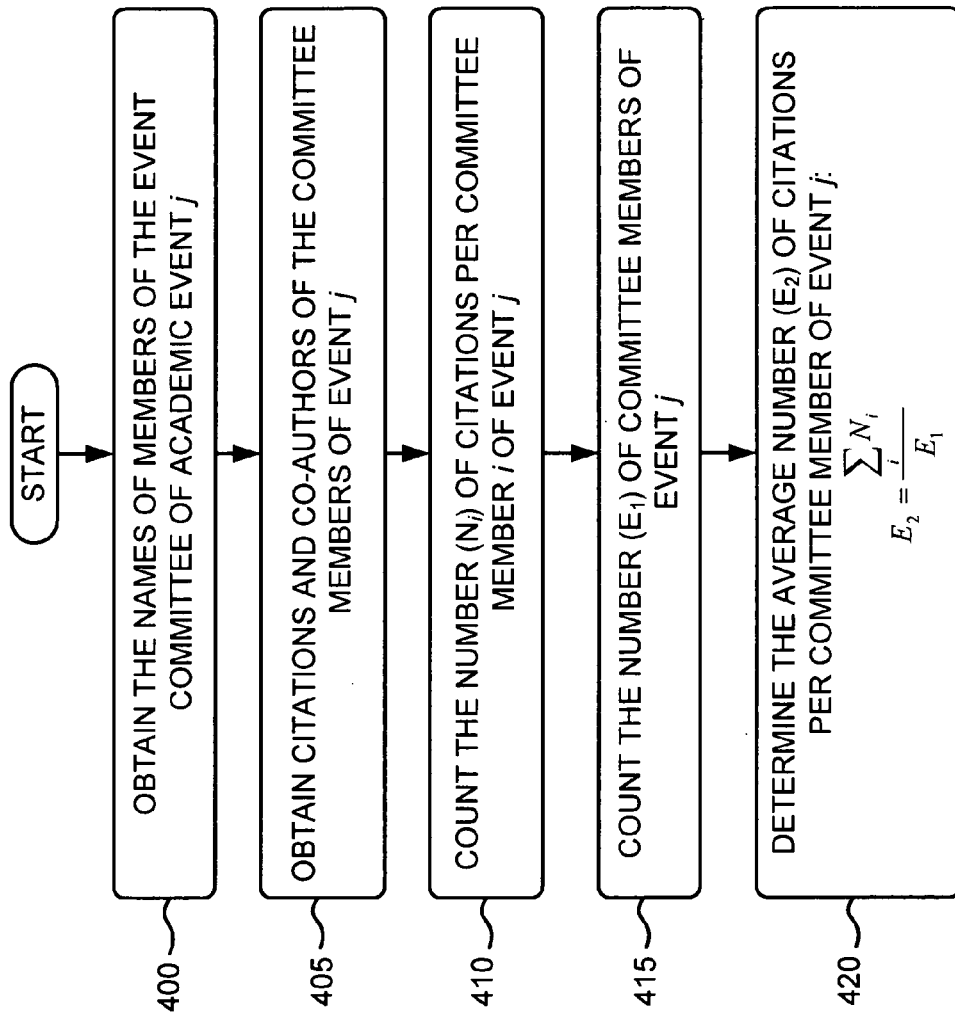
Figure 4D:
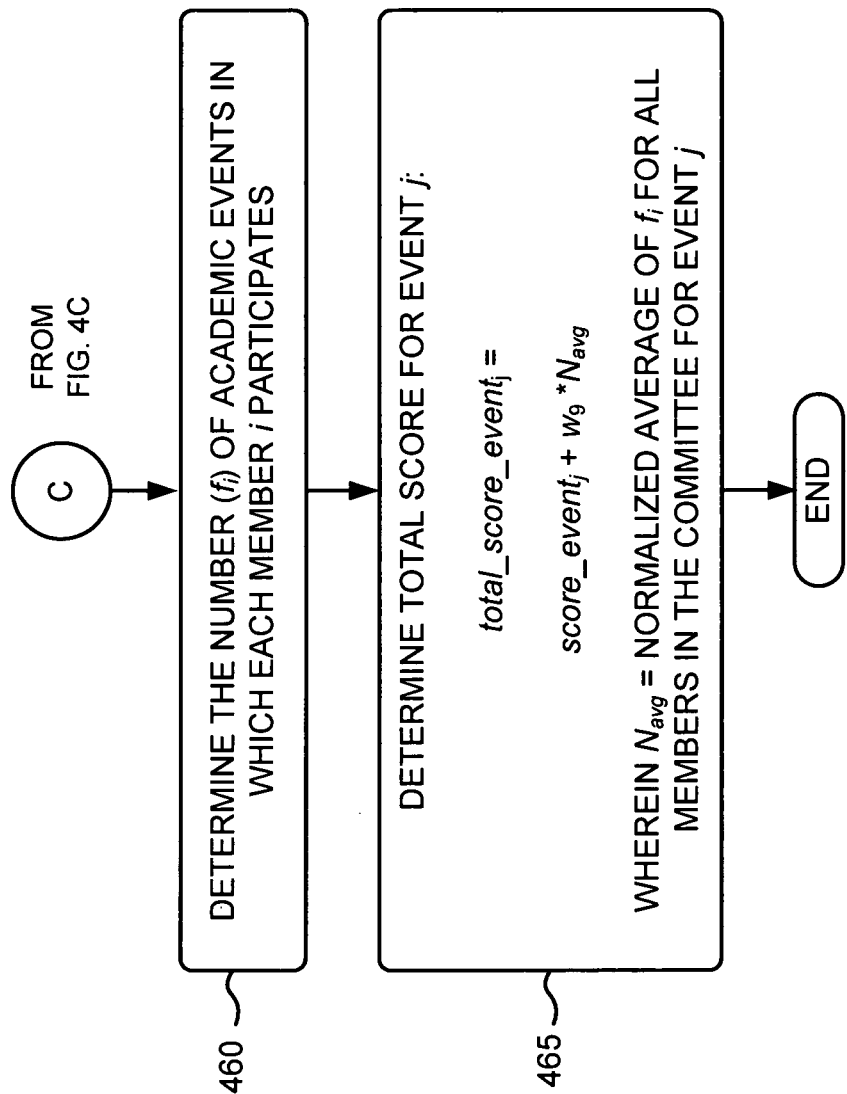

FIG. 2 is an exemplary diagram of a network 200 in which systems and methods consistent with the principles of the invention may be implemented. Network 200 may include multiple clients 210 connected to one or more servers 220-230 via a network 240. Two clients 210 and two servers 220-230 have been illustrated as connected to network 240 for simplicity. In practice, there may be more or fewer clients and servers. Also, in some instances, a client may perform one or more functions of a server and a server may perform one or more functions of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220 and 230 may include server entities that access, fetch, aggregate, process, search, and/or maintain documents in a manner consistent with the principles of the invention. Clients 210 and servers 220 and 230 may connect to network 240 via wired, wireless, and/or optical connections.

In an implementation consistent with the principles of the invention, server 220 may include a search engine 225 usable by users at clients 210. Server 220 may implement a data aggregation service by crawling a corpus of documents (e.g., web pages) hosted on data server(s) 230, indexing the documents, and storing information associated with these documents in a repository of crawled documents. The aggregation service may be implemented in other ways, such as by agreement with the operator(s) of data server(s) 230 to distribute their documents via the data aggregation service. Search engine 225 may execute a search using a query, received from a user at a client 210, on the corpus of documents stored in the repository of crawled documents. The query may, for example, be directed at searching for documents related to one or more academic events, such as, for example, conferences, workshops, or journals. Server 220 may provide, to a user issuing a query, a ranked list of documents related to the one or more academic events. The list of documents may be ranked based on metrics of committee members of the one or more academic events, as described in more detail below.

Data server(s) 230 may store or maintain documents that may be crawled by server 220. Such documents may include data related to academic events, such as, for example, academic conferences, workshops, or journals. Such documents may further include data related to published news stories, products, images, user groups, geographic areas, or any other type of data. For example, server(s) 230 may store or maintain news stories from any type of news source, such as, for example, the Washington Post, the New York Times, Time magazine, or Newsweek. As another example, server(s) 230 may store or maintain data related to specific products, such as product data provided by one or more product manufacturers. As yet another example, server(s) 230 may store or maintain data related to other types of web documents, such as pages of web sites.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

EXEMPLARY CLIENT/SERVER ARCHITECTURE

FIG. 3 is an exemplary diagram of a client or server entity (hereinafter called "client/server entity"), which may correspond to one or more of clients 210 and/or servers 220-230, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

EXEMPLARY ACADEMIC EVENT SCORING PROCESS

FIGS. 4A-4D is a flowchart of an exemplary process for scoring academic events based on event committee member metrics consistent with principles of the invention. The process exemplified by FIGS. 4A-4D may be performed by server 220, or by another entity separate from, or in conjunction with, server 220. The exemplary process of FIGS. 4A-4D may be selectively repeated for each academic event of multiple academic events.

Figure 5:
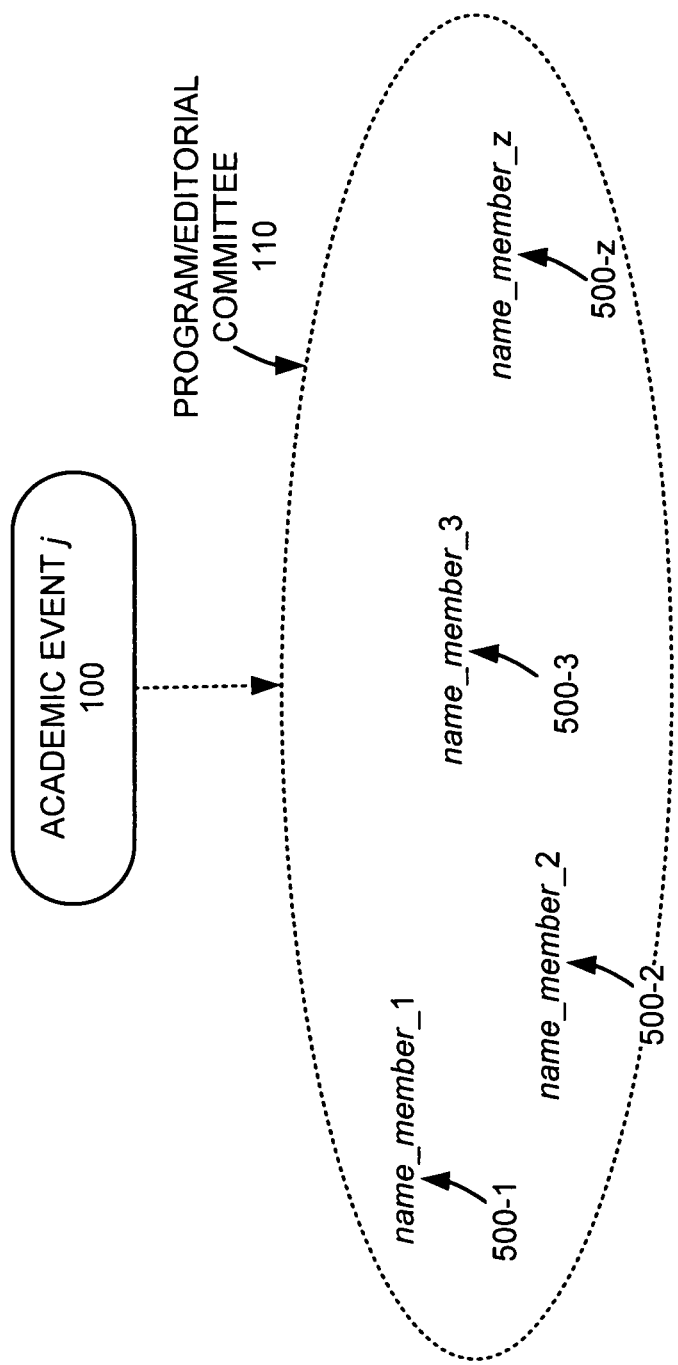
FIGS. 5-17 are diagrams illustrating various exemplary metrics used for scoring academic events consistent with principles of the invention.

The exemplary process may begin with obtaining the names of members in the event committee of academic event j (block 400). The event committee may include the program or editorial committee of the conference, workshop or journal. The names of members in the event committee of academic event j may be obtained by extracting the names from existing data sources, such as, for example, the Science Citation Index (SCI), CiteSeer or Scholar. FIG. 5 graphically illustrates obtaining multiple committee member names 500-1 through 500-z from program/editorial committee 110 of academic event 100.

Figure 6:
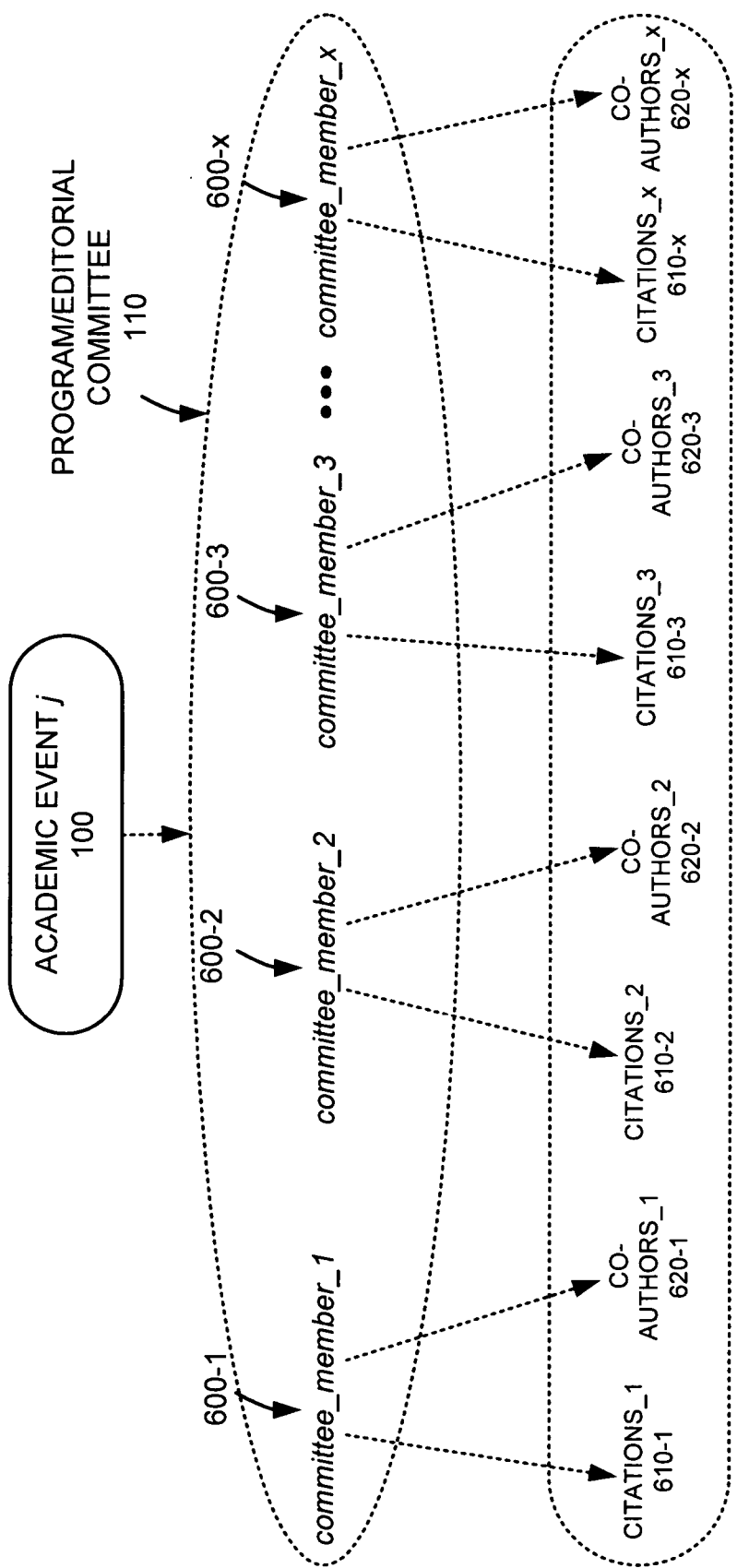

Citations and co-authors of the committee members of event j may be obtained (block 405). The citations and co-authors may be obtained from existing data sources, such as, for example, the Science Citation Index (SCI), CiteSeer or Scholar. The citations for each of the committee members may include a number of the citable instances of academic work for which each committee member is an author or contributor. The co-authors of each of the committee members may include the named co-authors on each of the citable instances of academic work on which each member is a named author. FIG. 6 graphically illustrates obtaining citations and co-authors for each committee member 600-1 through 600-x of program editorial committee 110 of academic event j 100. As shown in FIG. 6, citations 610-1 through 610-x and co-authors 620-1 through 620-x may be obtained from an existing data source for respective committee members 600-1 through 600-x.

Figure 7:
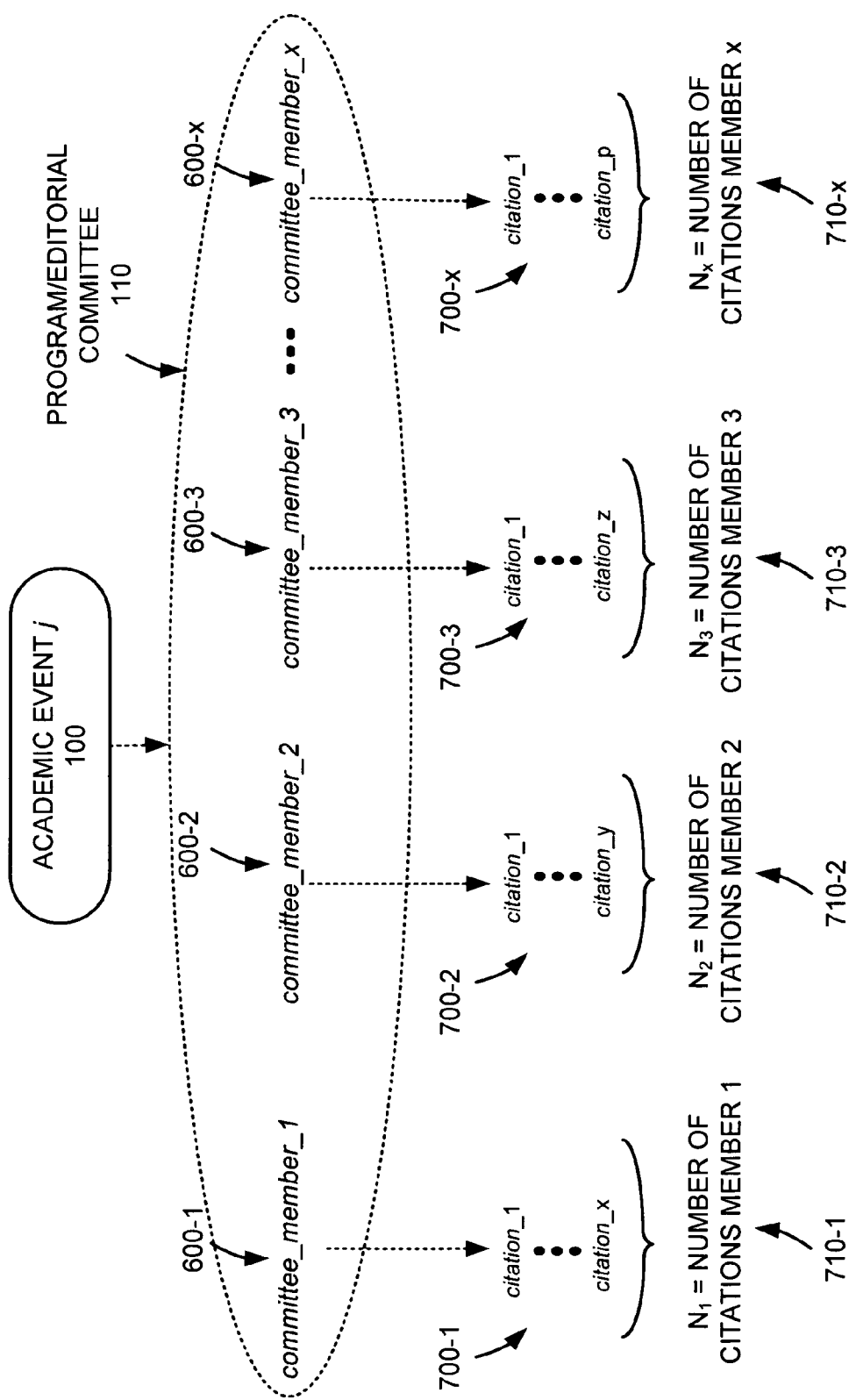

The number ($N_i$) of citations per committee member i of event j may be counted (block 410). Using the citation data obtained in block 405 above, the number ($N_i$) of citations per committee member may be counted, as graphically illustrated in FIG. 7. As shown in FIG. 7, the citations 700-1 through 700-x for respective committee members 600-1 through 600-x may be counted. Counts of respective citations 700-1 through 700-x results in a number ($N_i$) of citations 710-1 through 710-x for each respective committee member.

Figure 8:
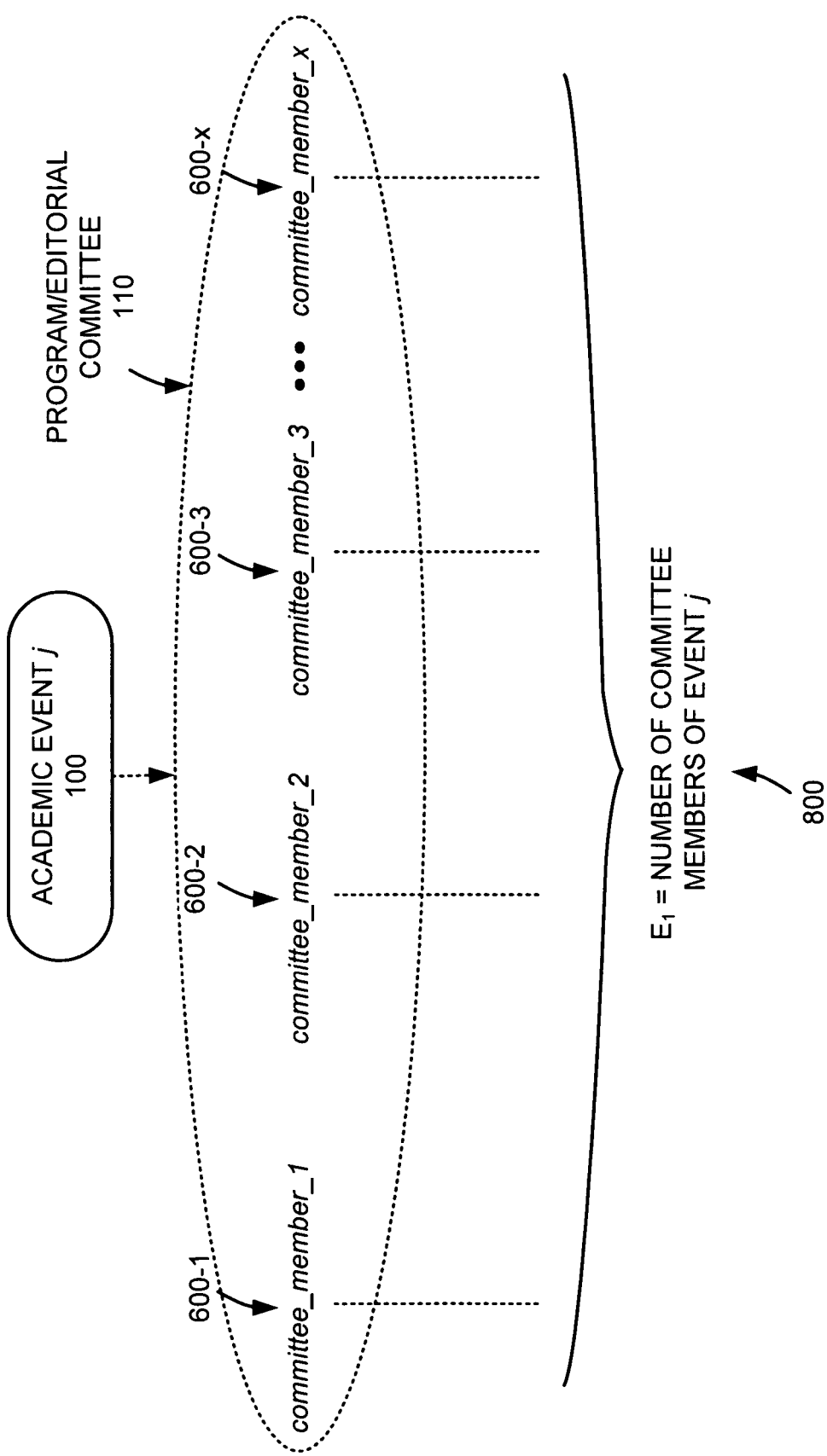

The number ($E_1$) of committee members of event j may be counted (block 415). FIG. 8 illustrates the counting of program/editorial committee members 600-1 through 600-x of program/editorial committee of academic event j 100 to produce a count equaling the number ($E_1$) 800 of committee members of event j.

Figure 9:
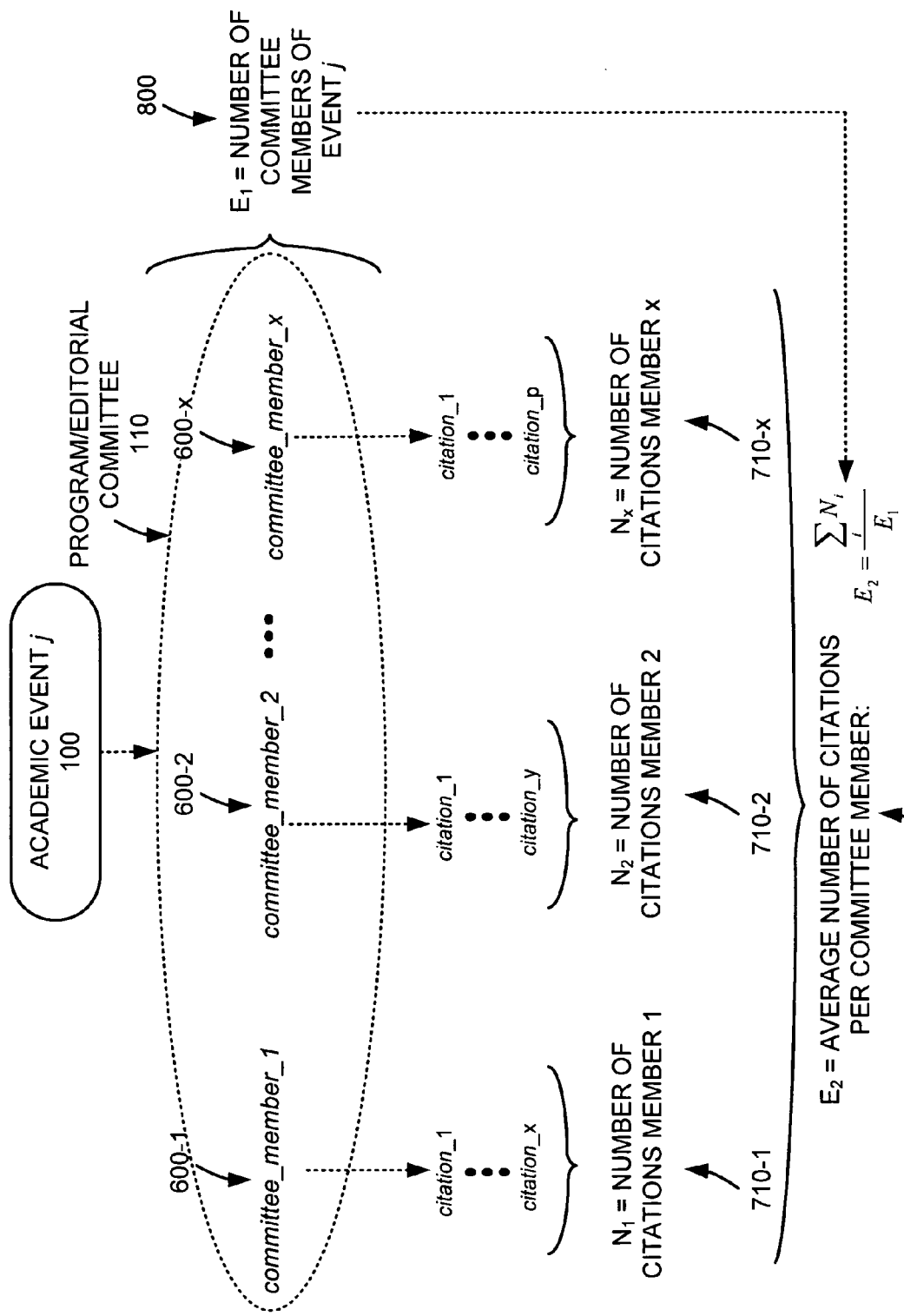

The average number ($E_2$) of citations per committee member of event j may be determined (block 420) as follows:

$$E_2 = \frac{\sum_i N_i}{E_1} \qquad \text{Eqn. (1)}$$

where $N_i$ may refer to a number of citations for committee member i. FIG. 9 illustrates a determination of the average number of citations per committee member 900. As shown in FIG. 9, the number of citations 710-1 through 710-x for each respective member may be summed and divided by the number of committee members ($E_1$) to produce the average number of citations ($E_2$) per committee member 900.

Figure 10:
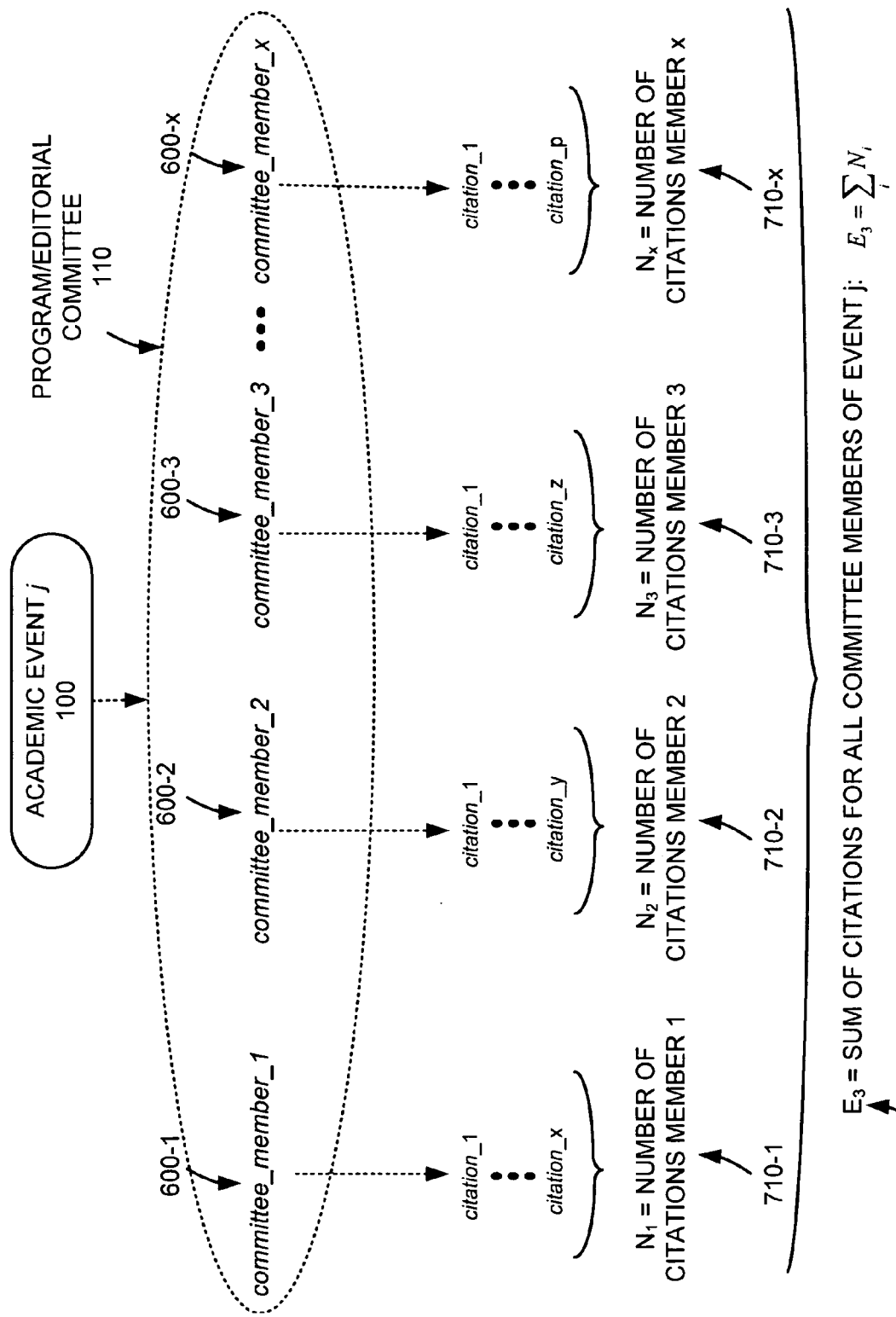

The sum of citations ($E_3$) for all committee members of event j may be determined (block 425). As shown in FIG. 10, the number of citations 710-1 through 710-x for all of the committee members 600-1 through 600-x of program/editorial committee 110 may be summed to produce the sum value $E_3$ 1000.

Figure 11:
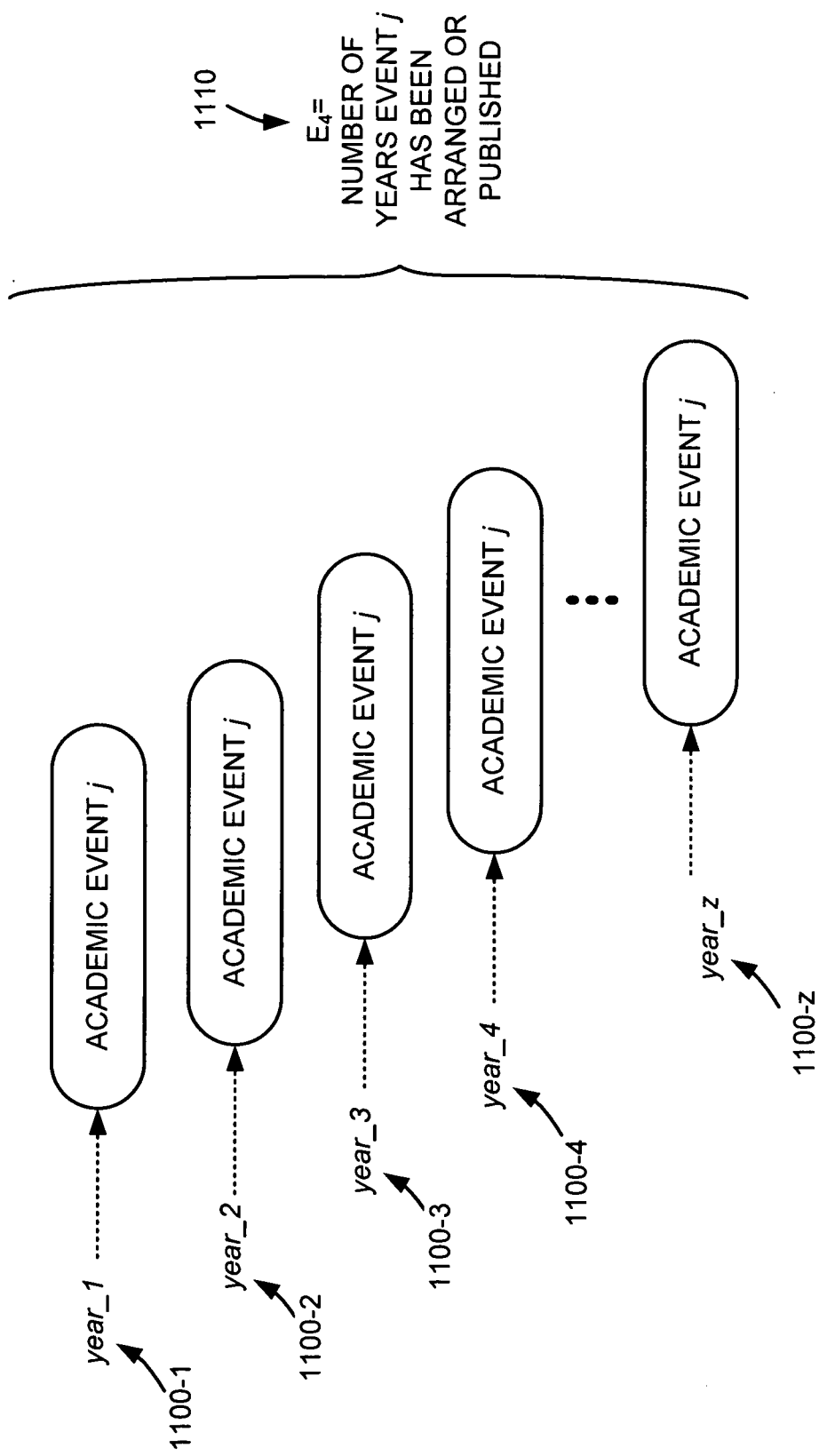

The number of years ($E_4$) the event j has been arranged or published may be determined (block 430). As illustrated in FIG. 11, each year 1100-1 through 1100-z that academic event j has been arranged or published may be counted to determine the value $E_4$ 1100. Other metrics, directly associated with the academic event but not with the event committee members, may additionally, or alternatively, used. Such metrics may, for example, include:

1) important topics associated with the event (e.g., keywords in a list);
2) an identification of the publisher of the journal or conference/workshop proceedings;
3) dates associated with the event (e.g., submission deadlines, notification to authors dates, deadlines for camera-ready papers, event date(s));
4) other events corresponding to the event (e.g., a workshop belonging to a conference);
5) Uniform Resource Locators (URLs) to the event home page and/or to pages associated with event committee members;
6) description/abstract describing the event and its scope;
7) registration fees and instructions for the event;
8) address of the event; and/or
9) an identification of a sponsoring institution (e.g., IEEE, ACM, etc.)

Figure 12:
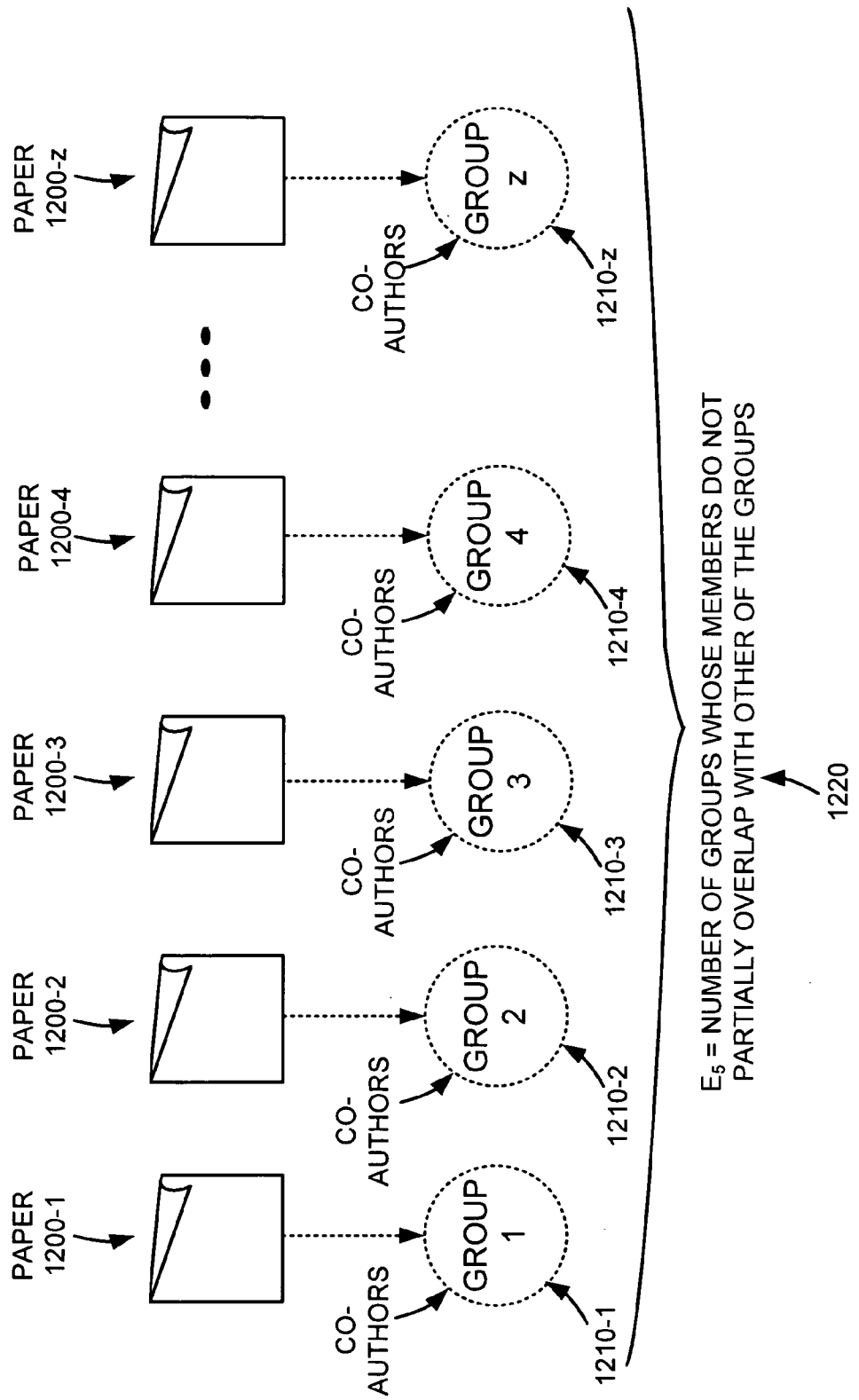

Committee members of event j that have been co-authors may be grouped together, and the number of the groups ($E_5$) whose members do not partially overlap with other of the groups may be counted (block 435). As shown in FIG. 12, papers 1200-1 through 1200-z may be identified that have authors and/or co-authors that are committee members. The co-authors for each paper 1200 may be grouped together in respective groups 1210-1 through 1210-z. Each group 1210 may be compared to count a number $E_5$ 1220 of the groups 1210-1 through 1210-z whose members do not partially overlap with other of the groups.

Figure 13:
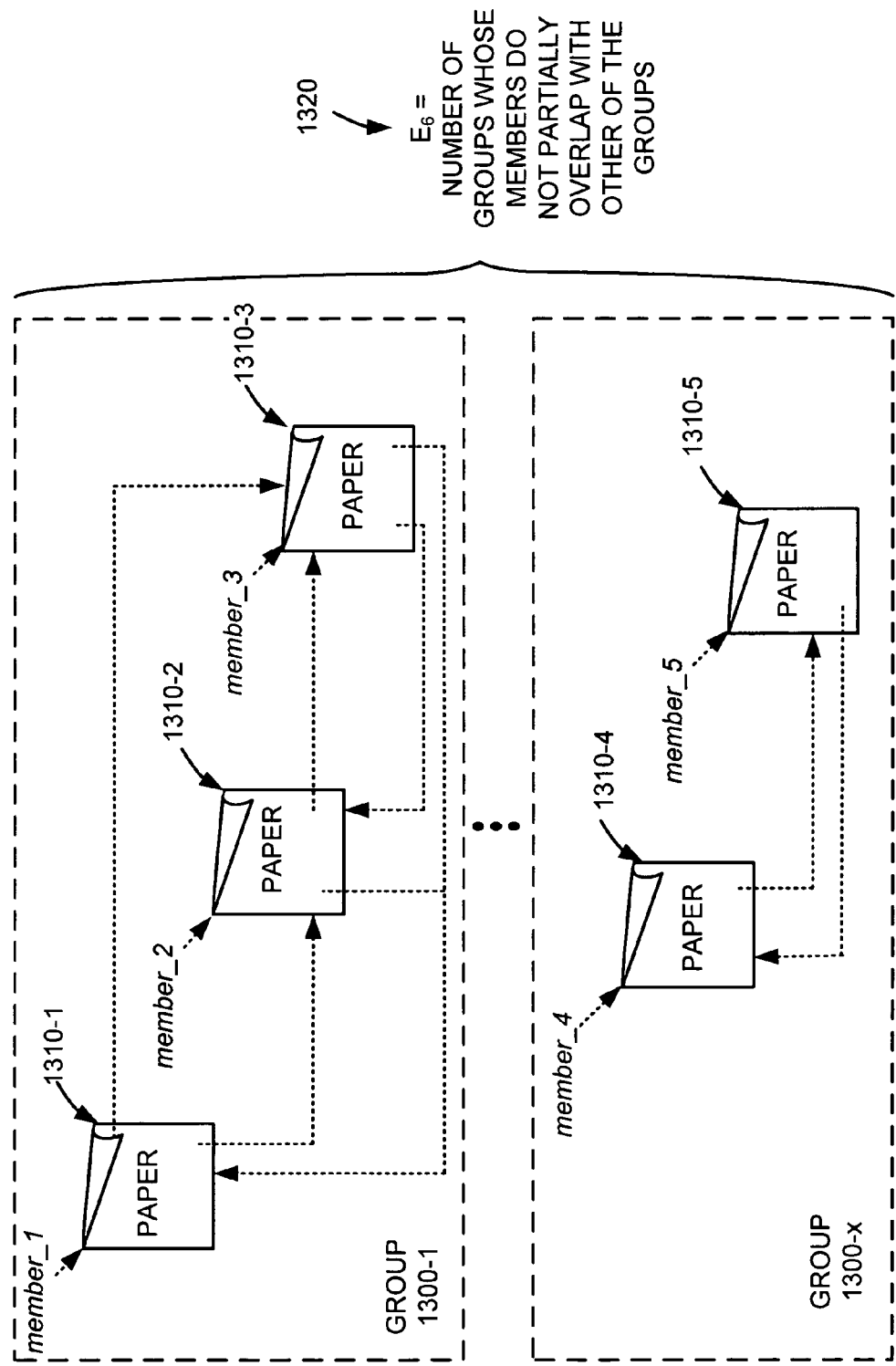

Committee members of event j that have cited each other may be grouped together, and the number of groups ($E_6$) whose members do not partially overlap with other of the groups may be counted (block 440). As illustrated in FIG. 13, groups of committee members may be grouped together who have authored/co-authored papers that cite other committee members in the group. For example, in a first group 1300-1, paper 1310-1, authored by member_1 cites paper 1310-2, authored by member_2, and cites paper 1310-3, authored by member_3. Paper 1310-2, authored by member_2, cites paper 1310-1, authored by member_1, and cites paper 1310-3, authored by member_3. Paper 1310-3, authored by member_3, cites paper 1310-2, authored by member_2, and cites paper 1310-1, authored by member_1. In a second group, group 1300-x, paper 1310-4, authored by member_4, cites paper 1310-5, authored by member_5. Paper 1310-5, authored by member_5, in turn, cites paper 1310-4. Thus, in group 1300-1, papers authored by a first group of committee members all cite one another and, in group 1300-x, papers authored by a second group of committee members all cite one another, with no overlap of committee members between group 1300-1 and 1300-x. Based on the grouping, as shown in FIG. 13, a number of groups ($E_6$) 1320 whose members do not partially overlap with other of the groups may be counted.

Figure 14:
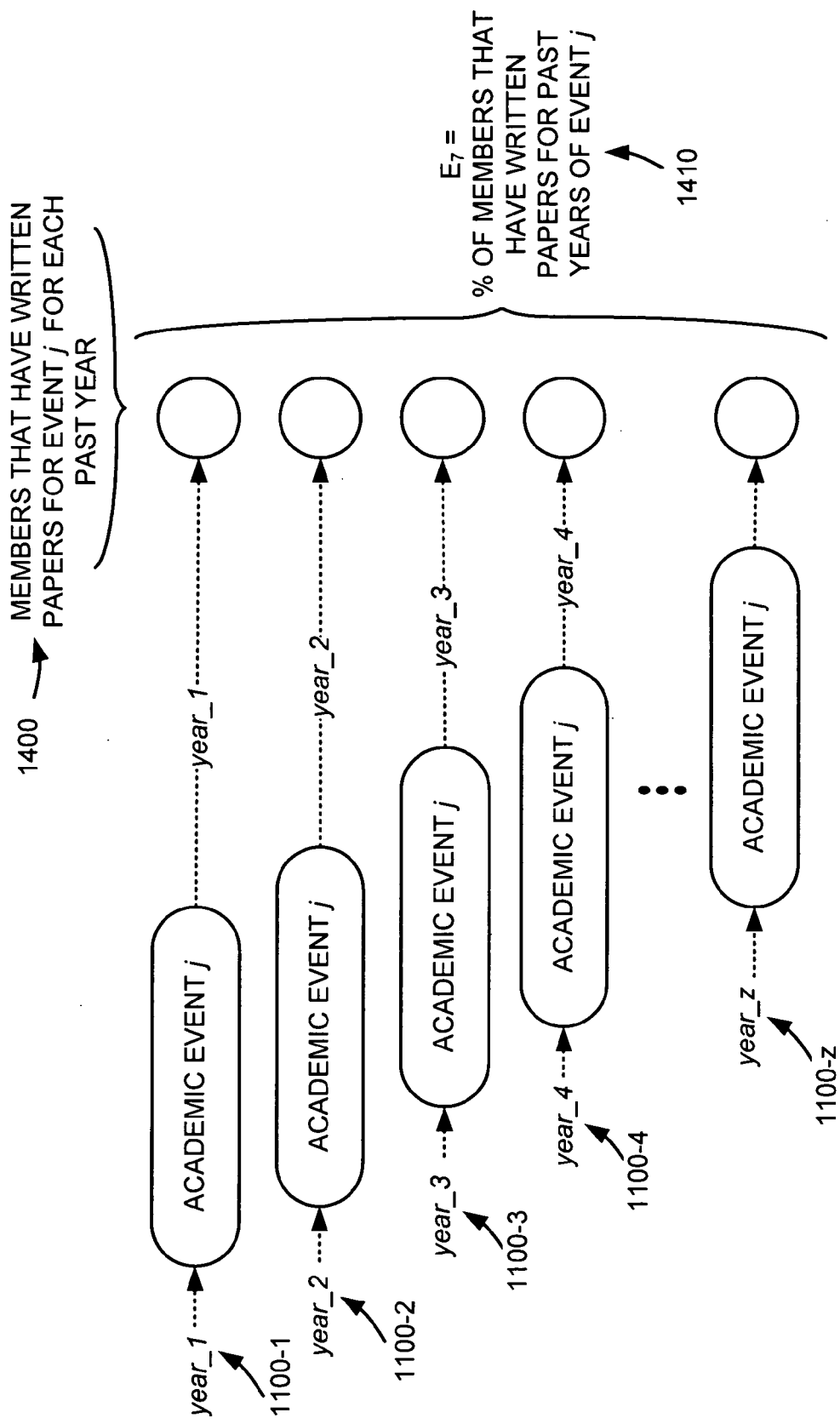

The percentage of committee members ($E_7$) that have written papers for past years of event j may be determined (block 445). As illustrated in FIG. 14, members 1400 that have written papers for each past year of event j may be determined, and the percentage of committee members ($E_7$) 1410 for a current year of event j that have written papers for past years of event j may be determined.

Figure 15:
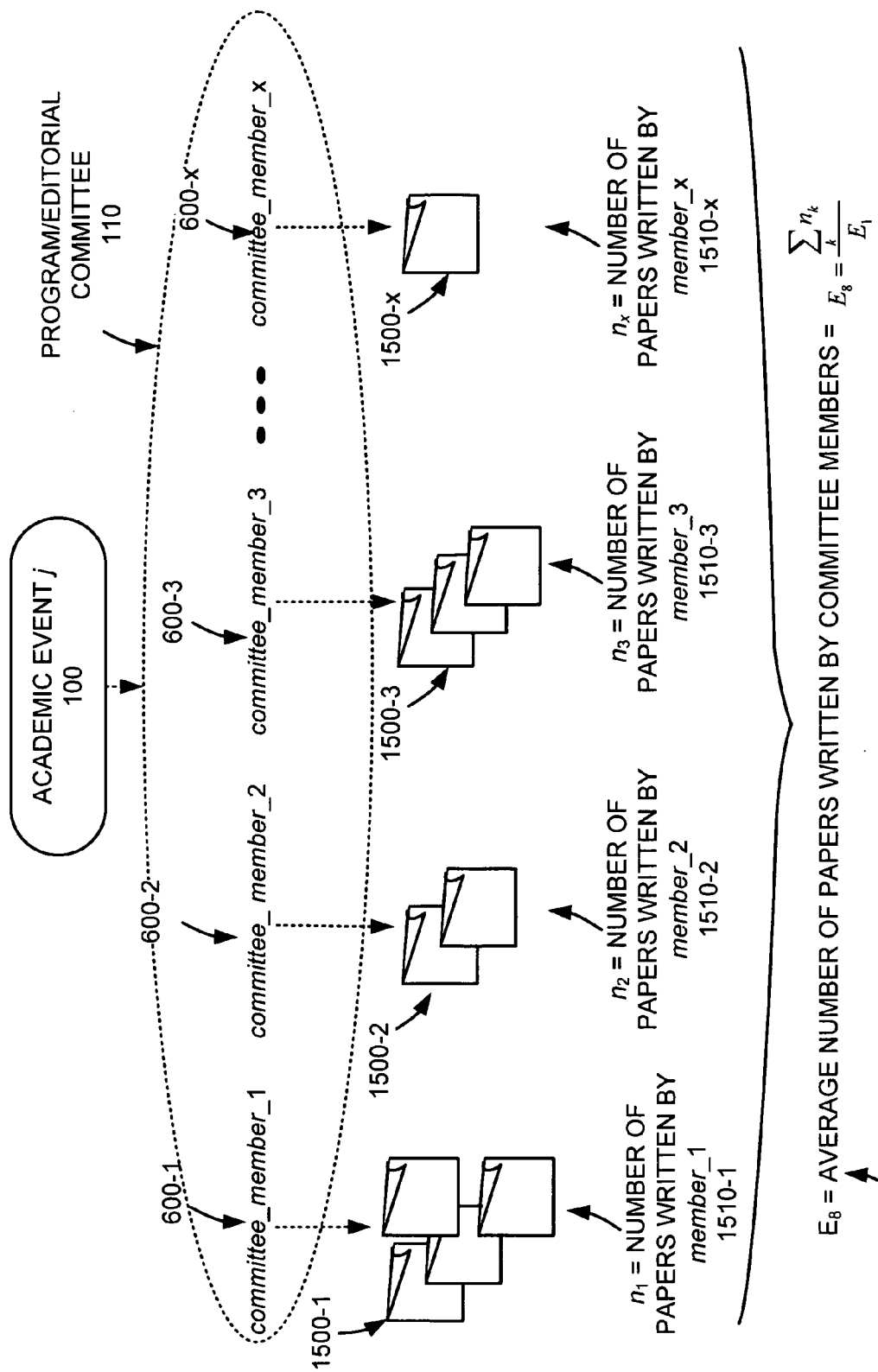

The average number ($E_8$) of papers written by committee members of event j may be determined (block 450) as follows:

$$E_8 = \frac{\sum_k n_k}{E_1} \qquad \text{Eqn. (2)}$$

where $n_k$ equals a number of papers written by committee member k. As illustrated in FIG. 15, each committee member 600-1 through 600-x has a respective group of papers 1500-1 through 1500-x that each member has written. A number ($n_k$) of papers 1510-1 through 1510-x that each member has written can be counted, and an average number ($E_8$) 1520 may be determined by summing the number ($n_k$) of papers for the k committee members and dividing the sum by the number of committee members $E_1$.

A score (score_event$_j$) may then be determined for academic event j (block 455):

$$\text{score\_event}_j = \sum_{l=1}^{l=8} w_l E_l \qquad \text{Eqn. (3)}$$

Figure 16:
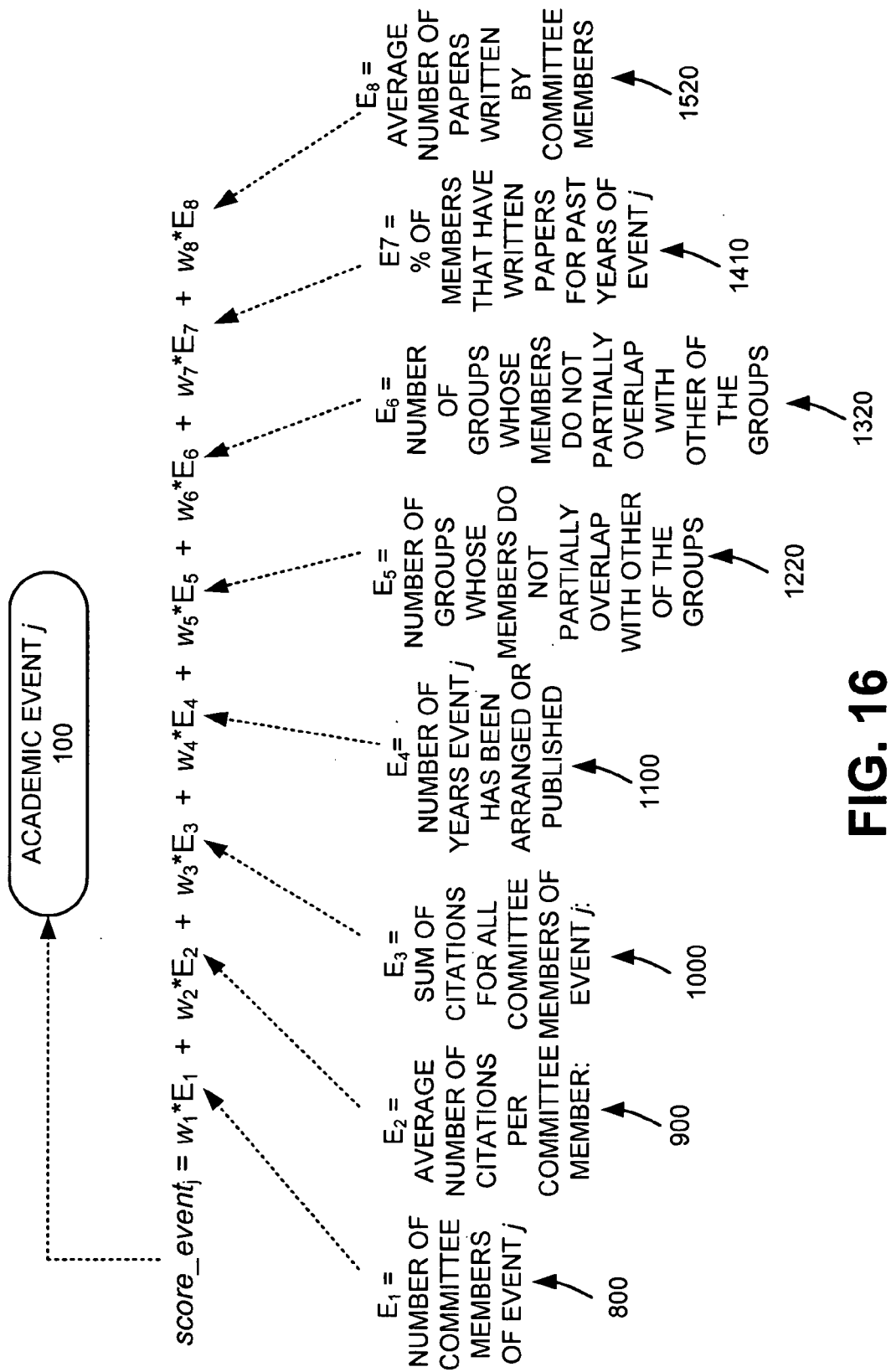

Each $E_l$ in Eqn. (3) corresponds to a metric obtained in blocks 415-450 above that may further be normalized (e.g., between 0 and 1). Default weights $w_1 \ldots w_8$ may be set equal to 1. In some implementations, weights $w_2$ (for average citations per member) and $w_4$ (for number of years published/arranged) may be increased to a value greater than 1. In other implementations, weights $w_5$, $w_6$ and $w_7$ may be set to negative values (e.g., to avoid increasing the scores of very tight research communities). FIG. 16 graphically illustrates the determination of the score (score_event$_j$) for academic event j 100 via the weighted sum of the normalized metrics.

Figure 17:
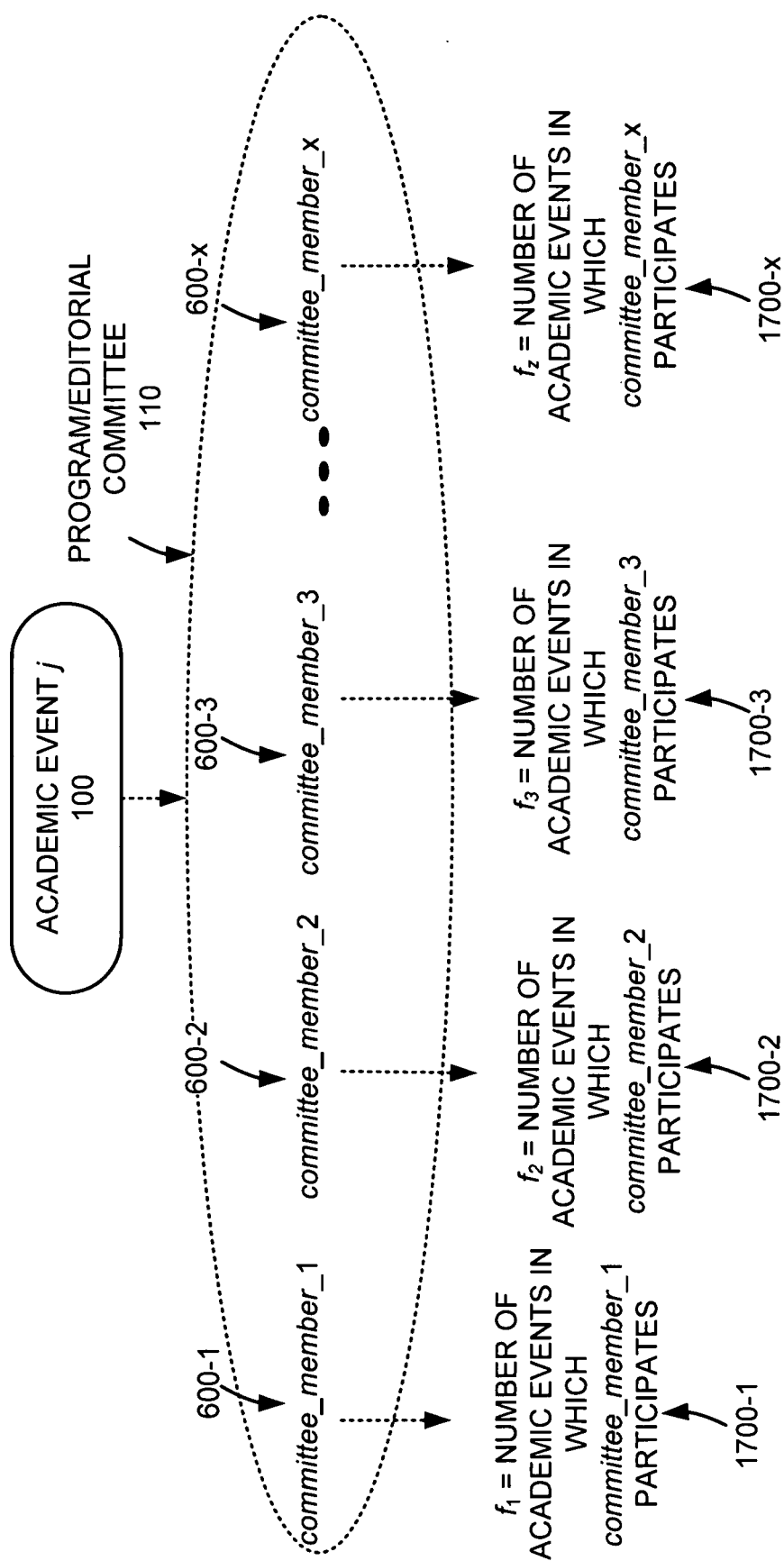

A number ($f_i$) of academic events in which each committee member i of event j participates may be determined (block 460). As shown in FIG. 17, a number of different academic events 1700-1 through 1700-x, including event j 100, that each committee member 600-1 through 600-x participates in may be determined.

A total score (total_score_event$_j$) for event j may be determined (block 465) as follows:

$$\text{total\_score\_event}_j = \text{score\_event}_j + w_9 * N_{avg} \qquad \text{Eqn. (4)}$$

where $N_{avg}$ may refer to the normalized average of $f_i$ for all members in the committee for event j and $w_9$ may be set equal to a default value of 1. In some implementations, weight $w_9$ may be adjusted downwards to account for committee members who may be members of many program/editorial committees even though they may not be highly ranked themselves. The total score (total_score_event$_j$) may subsequently used (see the exemplary process of FIG. 18 below) for ranking documents related to academic events among one another. The documents related to academic events may include, in some implementations, articles or papers published in journals or with respect to conferences of workshops. The total score, for example, may be used in a linear sum combination with existing search engine scoring techniques for ranking documents related to academic events among one another. Other metrics associated with event committee members may be used in addition to, or as alternatives to, those members described above with respect to blocks 415, 420, 425, 435, 440, 445, 450 and 460. These metrics associated with event committee members may include, for example, an identification of institutions or universities that individual committee members are associated with, contact information for individual committee members, or URLs to web pages associated with event committee members.

EXEMPLARY ACADEMIC EVENT RELATED DOCUMENTS RANKING PROCESS

Figure 18:
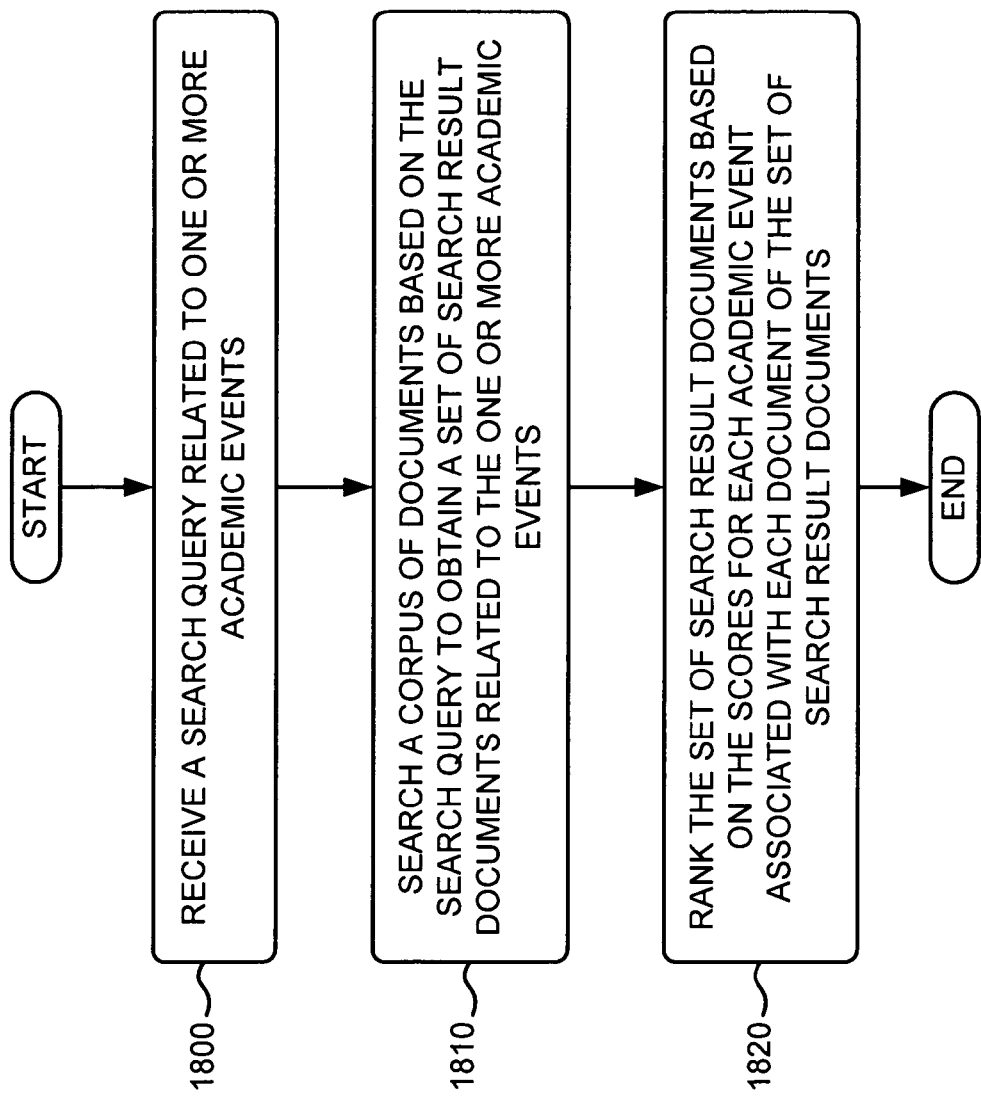
FIG. 18 is a flowchart of an exemplary process for ranking a set of search result documents that are related to one or more academic events based on the metrics of FIGS. 5-17 consistent with principles of the invention.

FIG. 18 is a flowchart of an exemplary process for ranking a set of search result documents that are related to one or more academic events based on the event committee member metrics consistent with principles of the invention. The process exemplified by FIG. 18 may be performed by server 220, or by another entity separate from, or in conjunction with, server 220.

Figure 19:
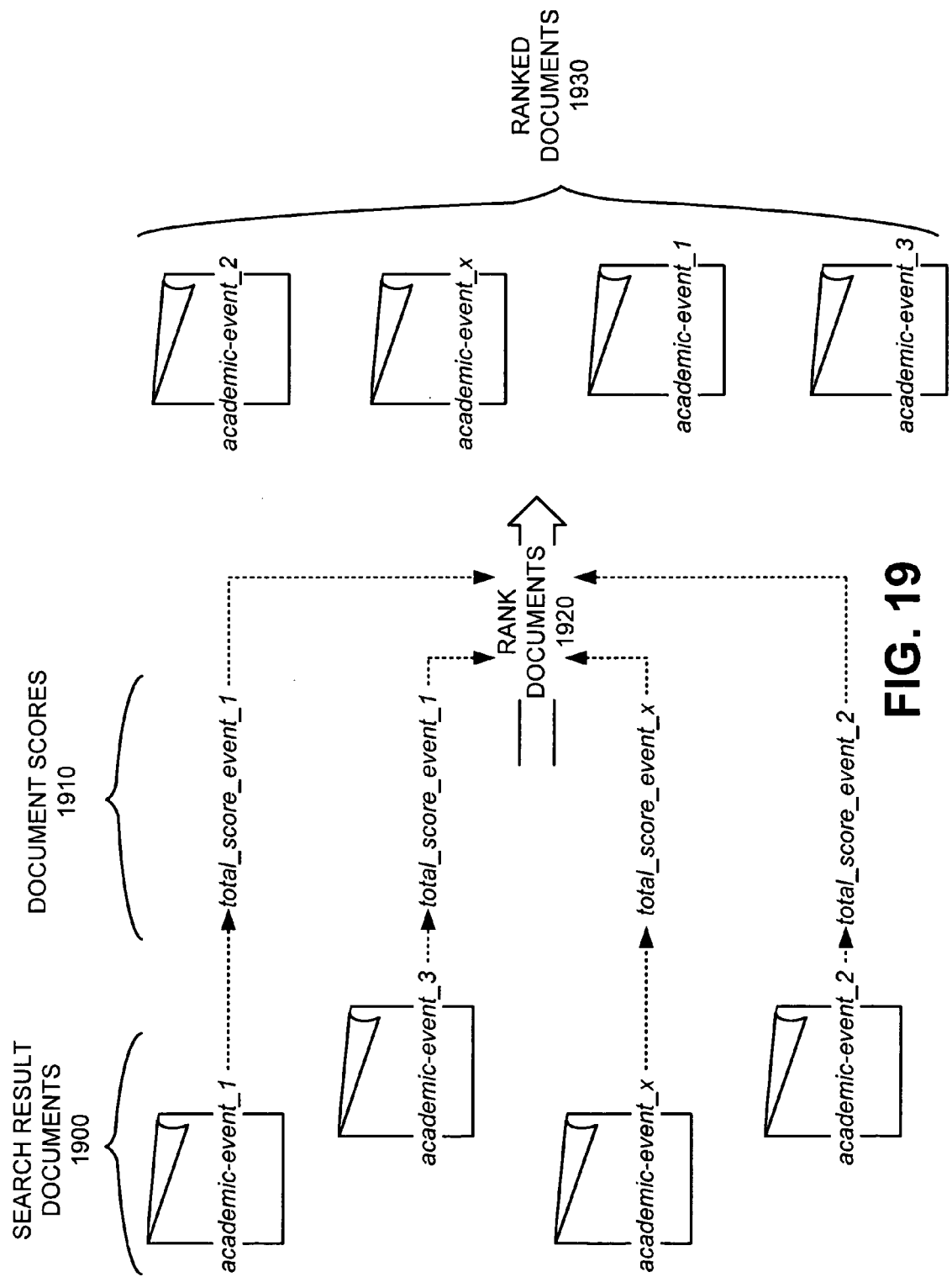
FIG. 19 is a diagram illustrating the exemplary ranking process of FIG. 18 consistent with principles of the invention.

The exemplary process may begin with the receipt of a search query related to one or more academic events (block 1800). A user at a client 210 may issue a search query related to the one or more academic events to search engine 225 via network 240. A corpus of documents may then be searched based on the received search query to obtain a set of search result documents related to the one or more academic events (block 1810). The search result documents may include, for example, web sites or web pages related to academic events, or articles or papers associated with the academic events (e.g., articles or papers published in journals, or with respect to conferences or workshops). Documents stored at data server(s) 230 may have been previously crawled, and indexed, by server 220, or by a crawling engine associated with server 220, to produce the corpus of documents searched by search engine 225. FIG. 19 illustrates the set of search result documents 1900 obtained by search engine 225 based on the received search query.

The set of search result documents may be ranked based on the scores for each academic event associated with each document of the set of search result documents (block 1820). The scores for each academic event may include the scores (total_score_event$_j$) obtained above with respect to the exemplary process of FIGS. 4A-4D. As shown in FIG. 19, the document scores 1910, obtained in the exemplary process of FIGS. 4A-4D, may be used to rank 1920 the set of search result documents 1900 and produce a set of ranked documents 1930. The document scores 1910 may be used (e.g., in a linear sum combination) with existing search engine scoring for ranking documents related to academic events among one another. In one implementation, for example, the search result documents may include articles or papers published in journals, or with respect to conferences or workshops, and the articles or papers may be ranked among one another. The score of their corresponding conference, journal or workshop may, thus, be used to rank each article or paper of a set of articles or papers among one another.

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 4A-4D and 18, the order of the acts may be modified in other implementations consistent with the principles of the invention. Further, non-dependent acts may be performed in parallel. In addition to ranking documents associated with academic events, aspects of the invention may be applied to ranking the academic events themselves among one another using the metrics directly associated with the academic events or using the metrics associated with the academic event committee members. Aspects of the invention may also be applied to ranking events other than academic events, or for ranking documents associated with events other than academic events. For example, metrics associated with events such as beauty pageants may be used for ranking documents associated with the beauty pageants, or for ranking the events themselves among one another. As another example, metrics associated with committee members of events (e.g., beauty pageants) may be used for ranking documents associated with the events, or for ranking the events themselves among one another. Any type of event may be ranked consistent with principles of the invention.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
    determining, by a processor of the one or more server devices, committee members of a committee associated with an event based on data stored within a digital memory device;
    obtaining, by a processor of the one or more server devices, metrics associated with the committee members who are authors or contributors of first documents;
    receiving, by a processor of the one or more server devices, a search query related to the event;
    identifying, by a processor of the one or more server devices, a set of documents based on the search query; and
    ranking, by a processor of the one or more server devices and based on the metrics associated with the committee members, documents in the set of documents, based on receiving the search query, where the set of documents does not include the first documents.

2. The method of claim 1, where the event comprises an academic event.

3. The method of claim 2, where the academic event comprises one of a conference, workshop, or journal.

4. The method of claim 2, where the committee members include program or editorial committee members associated with the academic event.

5. The method of claim 1, further comprising:
    obtaining other metrics, where the other metrics comprise at least one of:
        information identifying a quantity of the committee members associated with the event,
        information identifying a quantity of events in which each of the committee members participates,
        information regarding a quantity of years that the event has been arranged or published,
        information identifying subjective topics associated with the event,
        an identification of a publisher associated with the event,
        dates associated with the event,
        information identifying other events corresponding to the event,
        a Uniform Resource Locator (URL) to a web page associated with the event or to pages associated with the committee members associated with the event,
        description/abstract describing the event and a scope of the event,
        information identifying registration fees and instructions for the event,
        addresses associated with the event, or
        an identification of a sponsoring institution for the event; and
    where ranking the documents includes:
        ranking the documents, in the set of documents, based on the obtained metrics and the obtained other metrics.

6. The method of claim 1, where the obtained metrics include one or more of the following:
    an average number of document citations associated with each of the committee members;

a sum of document citations for the committee members associated with the event;

a percentage of the committee members that have written one or more documents for past years of the event; or an average number of documents written by the committee members associated with the event.

7. The method of claim 1, where the metrics comprise a plurality of metrics and, the method further comprising:

assigning a score to the event based on the plurality of metrics; and using the assigned score when ranking the documents in the set of documents.

8. The method of claim 7, where assigning the score to the event comprises:

functionally combining the plurality of metrics to assign the score.

9. The method of claim 8, where functionally combining the plurality of metrics comprises:

using the function $$score = \sum_l w_l E_l$$

to assign the score, where score refers to the assigned score, $E_l$ refers to each metric of the plurality of metrics, and $w_l$ refers to a weight value assigned to each metric of the plurality of metrics.

10. A method performed by one or more server devices, the method comprising:

determining, by a processor of the one or more server devices and based on data stored within a digital memory device, committee members associated with a plurality of academic events, where the plurality of academic events comprise conferences, workshops, or journals and where the committee members include program or editorial committee members associated with the plurality of academic events;

obtaining, by a processor of the one or more server devices and from the digital memory device, parameters associated with the committee members associated with the plurality of academic events, where the parameters include citations of the committee members;

determining, by a processor of the one or more server devices, scores for the plurality of academic events, based on the obtained parameters; and ranking, based on the scores, results of a search relating to one or more of the plurality of academic events.

11. The method of claim 10, where the results of the search include articles or papers associated with the one or more of the plurality of academic events, and where ranking the results includes ranking the articles or papers among one another based on the scores.

12. The method of claim 10, further comprising:

obtaining other parameters, where the other parameters comprise at least one of:

information regarding a quantity of years each of the plurality of academic events has been arranged or published, information identifying topics associated with the plurality of academic events, an identification of a publisher associated with the plurality of academic events, dates associated with each of the plurality of academic events, information identifying other events corresponding to each of the plurality of academic events, Uniform Resource Locators (URLs) to a web page associated with each of the plurality of academic events or to pages associated with event committee members associated with each of the plurality of academic events, descriptions/abstracts describing the plurality of academic events and a scope of each of the plurality of academic events, information identifying registration fees and instructions for each of the plurality of academic events, information identifying addresses associated with each of the plurality of academic events, or an identification of a sponsoring institution for each of the plurality of academic events.

13. The method of claim 10, where the obtained parameters include at least one of the following:

a quantity of the committee members associated with each of the plurality of academic events;

an average number of document citations for each of the committee members;

a sum of document citations for the committee members associated with each of the plurality of academic events;

a percentage of the committee members associated with a given academic event that have written one or more documents for past years of the plurality of academic events;

an average number of documents written by the committee members associated with each of the plurality of academic events; or a quantity of academic events of the plurality of academic events in which each of the committee members participate.

14. A method performed by one or more server devices, the method comprising:

receiving, by the one or more server devices, a search query related to an academic event of a plurality of academic events, the academic event having a committee with one or more committee members, where the academic event comprises one of a conference, a workshop, or a journal and where the one or more committee members include program or editorial committee members associated with the academic event;

searching, by a processor of the one or more server devices, a corpus of documents associated with the plurality of academic events based on the search query to produce a set of search result documents; and ranking, by a processor of the one or more server devices, the set of search result documents based on first metrics associated with the one or more committee members associated with the academic event and second metrics associated with the plurality of academic events.

15. The method of claim 14, where the second metrics associated with the plurality of academic events comprise one or more of the following:

information regarding a quantity of years each of the plurality of academic events has been arranged or published;

information identifying topics associated with the plurality of academic events;

an identification of a publisher associated with the plurality of academic events;

dates associated with each of the plurality of academic events;

information identifying other events corresponding to each of the plurality of academic events;

Uniform Resource Locators (URLs) to web pages associated with the plurality of academic events or to pages associated with event committee members associated with the plurality of academic events;

descriptions/abstracts describing the plurality of academic events and a scope of each of the plurality of academic events;

information identifying registration fees and instructions for each of the plurality of academic events;

addresses associated with each of the plurality of academic events; or an identification of a sponsoring institution for each of the plurality of academic events.

16. The method of claim 14, where the first metrics include at least one of the following:

a quantity of the committee members associated with the academic event;

an average number of document citations associated with each of the one or more committee members;

a sum of document citations for all of the one or more committee members associated with the academic event;

a percentage of the one or more committee members that have written one or more documents for past years of the academic event;

an average number of documents written by the one or more committee members associated with the academic event; or a quantity of academic events in which each of the one or more committee members participate.

17. A system, comprising:

means for determining parameters associated with committee members associated with a plurality of academic events, where the plurality of academic events comprise conferences, workshops, or journals, and where the committee members include program committee members associated with the plurality of academic events;

means for determining scores for the plurality of academic events based on the determined parameters; and means for ranking, based on the scores, results of a search for documents associated with one or more of the plurality of academic events.

18. The system of claim 17, where the results of the search include articles or papers associated with the one or more of the plurality of academic events, and where the means for ranking the results includes means for ranking the articles or papers among one another based on the determined scores.

19. The system of claim 17, further comprising:

means for obtaining other metrics, where the other metrics comprise at least one of:

information regarding a quantity of years each of the plurality of academic events has been arranged or published, information identifying topics associated with the plurality of academic events, an identification of a publisher associated with the plurality of academic events, dates associated with each of the plurality of academic events, information identifying other events corresponding to each of the plurality of academic events, Uniform Resource Locators (URLs) to web pages associated with the plurality of academic events or to pages associated with event committee members associated with the plurality of academic events, descriptions/abstracts describing the plurality of academic events and their scope, information identifying registration fees and instructions for each of the plurality of academic events, addresses associated with each of the plurality of academic events, or an identification of a sponsoring institution for each of the plurality of academic events.

20. The system of claim 17, where the determined parameters include at least one of the following:

a quantity of the committee members associated with each of the plurality of academic events;

an average number of document citations for each of the committee members;

a sum of document citations for committee members associated with each of the plurality of academic events;

a percentage of the committee members associated with a given academic event that have written one or more documents for past years of the plurality of academic events;

an average number of documents written by the committee members associated with each of the plurality of academic events; or a quantity of academic events of the plurality of academic events in which each of the committee members participate.

21. A computer-readable memory device that stores computer-executable instructions, the computer-readable memory device comprising:

instructions for determining committee members of a committee associated with an academic event, from data stored within a memory, where the academic event comprises one of a conference, workshop, or journal and where the committee members include program or editorial committee members associated with the academic event;

instructions for obtaining first metrics associated with documents in which the committee members are authors or contributors;

instructions for obtaining second metrics associated with the academic event, where the second metrics are different from the first metrics; and instructions for ranking documents associated with the academic event among other documents based on the obtained first and second metrics.

22. The computer-readable memory device of claim 21, further comprising:

instructions for obtaining other metrics, where the other metrics comprise at least one of:

a quantity of the committee members associated with the academic event, a quantity of academic events in which each of the committee members participate, information regarding a number of years that the academic event has been arranged or published, information identifying topics associated with the academic event, an identification of a publisher associated with the academic event, dates associated with the academic event, information identifying other events corresponding to the academic event, a Uniform Resource Locator (URL) to a web page associated with the academic event or to a page associated with one of the committee members associated with the academic event, description/abstract describing the academic event and a scope of the academic event, information identifying registration fees and instructions for the academic event, an address associated with the academic event, or an identification of a sponsoring institution for the academic event; and where the instructions for ranking the documents associated with the academic event further include:
instructions for ranking the documents associated with the academic event among
other documents based on the obtained first metrics, the obtained second metrics, and the obtained other metrics.

23. The computer-readable memory device of claim 21, where the obtained first metrics include one or more of the following:
an average number of document citations associated with each of the committee members;
a sum of document citations for the committee members associated with the academic event;
a percentage of the committee members that have written one or more documents for past years of the academic event; or
an average number of documents written by the committee members associated with the academic event.

24. A system, comprising:
a memory to aggregate a corpus of documents related to a plurality of academic events; and
a processing unit to:
determine a plurality of metrics associated with committee members associated with an academic event of the plurality of academic events, where the plurality of metrics include first metrics associated with documents in which the committee members are authors or contributors and second metrics associated with the academic event,
assign a score to the academic event based on the plurality of metrics, and
use the assigned score to rank a document associated with the academic event among other documents of the corpus of documents.

25. A method performed by one or more server devices, the method comprising:
obtaining, by a processor of the one or more server devices and from a memory, metrics associated with a plurality of events, where the metrics associated with the plurality of events comprise information regarding a number of years each of the plurality of events has been arranged or published, and
one or more of the following:
information identifying topics associated with the plurality of events,
an identification of a publisher associated with the plurality of events,
dates associated with each of the plurality of events,
information identifying other events corresponding to each of the plurality of events,
Uniform Resource Locators (URLs) to web pages associated with the plurality of events or to pages associated with event committee members associated with the plurality of events,
descriptions/abstracts describing the plurality of events and a scope of each of the plurality of events,
information identifying registration fees and instructions for each of the plurality of events,
addresses associated with each of the plurality of events, or
an identification of a sponsoring institution for each of the plurality of events;
determining, by a processor of the one or more server devices, scores for each of the plurality of events based on the obtained metrics; and
ranking, by a processor of the one or more server devices, results of a search relating to one or more of the plurality of events based on the determined scores.

26. The method of claim 25, where ranking the results of the search includes:
ranking documents associated with the plurality of events based on the obtained metrics.

27. The method of claim 25, where the plurality of events comprise academic events.

28. The method of claim 27, where the academic events comprise conferences, workshops, or journals.

29. A method performed by one or more server devices, the method comprising:
determining, by a processor of the one or more server devices, committee members of a committee associated with an event, the committee members being selected from data stored within a digital memory device;
obtaining, by a processor of the one or more server devices, first metrics associated with documents in which the committee members are authors or contributors and second metrics associated with the event; and
ranking, by a processor of the one or more server devices, the event among other events based on the obtained first and second metrics.

30. The method of claim 29, where the event comprises an academic event.

31. The method of claim 30, where the academic event comprises one of a conference, workshop, or journal.

32. The method of claim 30, where the committee members include program or editorial committee members associated with the academic event.

33. The method of claim 29, where the obtained first metrics include one or more of the following:
an average number of document citations associated with each of the committee members;
a sum of document citations for all of the committee members associated with the event;
a percentage of the committee members that have written one or more documents for past years of the event; or
an average number of documents written by the committee members associated with the event.

34. The method of claim 29, where the obtained second metrics include one or more of the following:
a quantity of the committee members associated with the event,
a quantity of events in which each of the committee members participate,
information regarding a quantity of years that the event has been arranged or published,
information identifying topics associated with the event,
an identification of a publisher associated with the event,
dates associated with the event,
information identifying other events corresponding to the event,
a Uniform Resource Locator (URL) to a web page associated with the event or to pages associated with the committee members associated with the event,
description/abstract describing the event and a scope of the event,
information identifying registration fees and instructions for each event,
an address associated with the event, or
an identification of a sponsoring institution for the event.

* * * * *

UNITED STATES PATENT AND TRADEMARK OFFICE
CERTIFICATE OF CORRECTION

| | |
|---|---|
| PATENT NO. | : 8,489,614 B2 |
| APPLICATION NO. | : 11/302253 |
| DATED | : July 16, 2013 |
| INVENTOR(S) | : Amund Tveit |

It is certified that error appears in the above-identified patent and that said Letters Patent is hereby corrected as shown below:

In the Claims

Column 11, claim 9, line 19 should read: "using a function"

Signed and Sealed this
Twelfth Day of November, 2013

Teresa Stanek Rea
*Deputy Director of the United States Patent and Trademark Office*